(12) United States Patent
Okawa et al.

(10) Patent No.: US 7,093,110 B2
(45) Date of Patent: Aug. 15, 2006

(54) REGISTER FILE IN THE REGISTER WINDOW SYSTEM AND CONTROLLING METHOD THEREOF

(75) Inventors: Yasukichi Okawa, Kawasaki (JP); Hideo Yamashita, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 334 days.

(21) Appl. No.: 10/102,827

(22) Filed: Mar. 22, 2002

(65) Prior Publication Data

US 2003/0126415 A1  Jul. 3, 2003

(30) Foreign Application Priority Data

Dec. 28, 2001 (JP) .............................. 2001-400704

(51) Int. Cl.
 *G06F 12/00* (2006.01)
(52) U.S. Cl. ..................................... 712/228
(58) Field of Classification Search ................. 712/228
 See application file for complete search history.

(56) References Cited

U.S. PATENT DOCUMENTS

| | | | |
|---|---|---|---|
| 5,083,263 A * | 1/1992 | Joy et al. | 712/41 |
| 5,179,682 A * | 1/1993 | Jensen | 711/118 |
| 5,392,411 A | 2/1995 | Ozaki | |
| 5,440,714 A | 8/1995 | Wang | |
| 5,721,868 A | 2/1998 | Yung et al. | |
| 5,799,166 A * | 8/1998 | Leung | 712/216 |
| 5,875,483 A | 2/1999 | Tremblay | |
| 6,341,347 B1 * | 1/2002 | Joy et al. | 712/228 |

FOREIGN PATENT DOCUMENTS

| | | |
|---|---|---|
| JP | 63-316237 | 12/1988 |
| JP | 05-020010 | 1/1993 |
| JP | 5-35472 A | 2/1993 |
| JP | 8-44565 | 2/1996 |

OTHER PUBLICATIONS

Nakazawa et al., "Pseudo Vector Processor Based on Register-Windowed Superscalar Pipeline", Proceedings of Supercomputing '92, IEEE, Nov. 16-20, 1992, pp. 642-651.*

D.L. Weaver et al., "The SPARC Architecture Manual" Version 9, SPARC International, Inc., 1994, pp. 30-35.

R. Heald et al., "A Third-Generation SPARC V9 64-b Microprocessor", IEEE Journal of Solid-State Circuits, vol. 35, No. 11, pp. 1526-1535.

The Patent Office, Search Report Under Section 17, Oct. 10, 2002.

* cited by examiner

*Primary Examiner*—William M. Treat
(74) *Attorney, Agent, or Firm*—Staas & Halsey LLP

(57) ABSTRACT

In the structure of register files composed of a master register file and a working register file, when data is read, the working register file is accessed. When data is written, the both the master register file and the working register file are accessed. In the working register file, data of the current window, and data preceded thereby, and data followed thereby are stored. Thus, even if the SAVE instruction or the RESTORE instruction are successively executed, instructions can be processed out of order. As a result, the efficiency of the process is improved.

17 Claims, 28 Drawing Sheets

| WHEN SAVE INSTRUCTION IS EXECUTED | MRF OF LOCAL PORTION POINTED BY CWP + 2 IS TRANSFERRED TO WRF OF WP=(WP+4-1 OF LOCAL PORTION) MOD 7+1<br>MRF OF OUT PORTION POINTED BY CWP + 2 IS TRANSFERRED TO WRF OF WP=(WP+4-1 OF OUT PORTION) MOD 7+1 |
|---|---|
| WHEN RESTORE INSTRUCTION IS EXECUTED | MRF OF LOCAL PORTION POINTED BY CWP - 2 IS TRANSFERRED TO WRF OF WP=(WP-4-1 OF LOCAL PORTION) MOD 7+1<br>MRF OF in PORTION POINTED BY CWP - 2 IS TRANSFERRED TO WRF OF WP=(WP-4-1 OF in PORTION) MOD 7+1 |

FIG. 3

*THREE ELEMENTS OF WP ARE ["IN" POINTED BY WP, "LOCAL" POINTED BY WP, AND "OUT" POINTED BY WP]

| CWP | 0 | 1 | 2 | 3 | 4 | 5 | 6 | 7 |
|---|---|---|---|---|---|---|---|---|
| WP | [3,4,5] | [5,6,7] | [7,2,1] | [1,4,3] | [3,6,5] | [5,2,7] | [7,4,1] | [1,6,3] |
| CWP | 0 | 1 | 2 | 3 | 4 | | | |
| WP | [3,2,5] | [5,4,7] | [7,6,1] | [1,2,3] | [3,4,5] | | | |

FIG. 6

WP OF OUT (r8 TO r15)      ... ( ( WCWP[1 : 0]+1)mod 4) X2+1
WP OF LOCAL (r16 TO r23)      ... WCWP[3:2] X2
WP OF IN (r24 TO r31)      ... WCWP [1:0] X2+1

FIG. 7

| WP | local | | WP | out/in | |
|---|---|---|---|---|---|
| | reg NUMBER | PHYSICAL ADDRESS | | reg NUMBER | PHYSICAL ADDRESS |
| 6 | r23 | 55 | 7 | r15/r31 | 63 |
| | ⋮ | ⋮ | | ⋮ | ⋮ |
| | r16 | 48 | | r8/r24 | 56 |
| 4 | r23 | 39 | 5 | r15/r31 | 47 |
| | ⋮ | ⋮ | | ⋮ | ⋮ |
| | r16 | 32 | | r8/r24 | 40 |
| 2 | r23 | 23 | 3 | r15/r31 | 31 |
| | ⋮ | ⋮ | | ⋮ | ⋮ |
| | r16 | 16 | | r8/r24 | 24 |
| 0 | r7 | 7 | 1 | r15/r31 | 15 |
| | ⋮ | ⋮ | | ⋮ | ⋮ |
| | r0 | 0 | | r8/r24 | 8 |

FOR LOCAL, WCWP [3:2] REPRESENTS WP. FOR IN/OUT, WCWP [1:0] REPRESENTS WP.

FIG. 8

| REG NUMBER | PHYSICAL ADDRESS |
|---|---|
| r0 ⋯ r7(global) | REG NUMBER |
| r8 ⋯ r15(out) | ((WCWP[1:0]+1) MOD 4) X 16 +reg NUMBER |
| r16 ⋯ r23(local) | WCWP[3:2] x 16 +reg NUMBER |
| r24 ⋯ r31(in) | (WCWP[1:0] -1)] x 16 +reg NUMBER |

FIG. 9

| WHEN SAVE INSTRUCTION IS EXECUTED: | new WCWP [3:2] ← (old WCWP [3:2] +1 -1) mod 3+1 |
|---|---|
| | new WCWP [1:0] ← (old WCWP [1:0] +1) mod 4 |
| WHEN RESTORE INSTRUCTION IS EXECUTED: | new WCWP [3:2] ← (old WCWP [3:2] -1 -1) mod 3+1 |
| | new WCWP [1:0] ← (old WCWP [1:0] -1) mod 4 |

FIG. 11

| BIT3 | BIT2 | ASSIGNMENT | |
|---|---|---|---|
| 0 | 0 | BANK1 | LOCAL/GLOBAL |
| 0 | 1 | BANK2 | LOCAL/GLOBAL |
| 1 | 0 | BANK3 | IN/OUT |
| 1 | 1 | BANK4 | IN/OUT |

FIG. 17

| bit5 | bit4 | ASSIGNMENT | | bit3 | bit2 | ASSIGNMENT | | bit1 | bit0 | ASSIGNMENT | |
|---|---|---|---|---|---|---|---|---|---|---|---|
| 0 | 0 | G | io1 | 0 | 0 | BANK1 | LOCAL/GLOBAL | 0 | 0 | r0 | r4 |
| 0 | 1 | lcl1 | io2 | 0 | 1 | BANK2 | LOCAL/GLOBAL | 0 | 1 | r1 | r5 |
| 1 | 0 | lcl2 | io3 | 1 | 0 | BANK3 | IN/OUT | 1 | 0 | r2 | r6 |
| 1 | 1 | lcl3 | io4 | 1 | 1 | BANK4 | IN/OUT | 1 | 1 | r3 | r7 |

FIG. 18

| | WCWP OF DESTINATION | |
|---|---|---|
| WHEN SAVE INSTRUCTION IS EXECUTED: | [3:2] | (WCWP [3:2] +2 -1) mod 3+1 |
| | [1:0] | (WCWP [1:0] +3) mod 4 |
| WHEN RESTORE INSTRUCTION IS EXECUTED: | [3:2] | (WCWP [3:2] -2 -1) mod 3+1 |
| | [1:0] | (WCWP [1:0] -2) mod 4 |

FIG. 19 bank1,2 local-low

| MOVE_dest_addr | | DESTINATION | |
|---|---|---|---|
| phase | WCWP [3:2] | bank1 | bank2 |
| 0 | 0 | 01 | I1 [0] | I1 [4] |
| | | 10 | I2 [2] | I2 [4] |
| | | 11 | I3 [0] | I3 [4] |

| MOVE_dest_addr | | DESTINATION | |
|---|---|---|---|
| phase | WCWP [3:2] | bank1 | bank2 |
| 0 | 1 | 01 | I1 [1] | I1 [5] |
| | | 10 | I2 [1] | I2 [5] |
| | | 11 | I3 [1] | I3 [5] | bank1,2 local-high

| MOVE_dest_addr | | DESTINATION | |
|---|---|---|---|
| phase | WCWP [3:2] | bank1 | bank2 |
| 1 | 0 | 01 | I1 [2] | I1 [6] |
| | | 10 | I2 [2] | I2 [6] |
| | | 11 | I3 [2] | I3 [6] |

| MOVE_dest_addr | | DESTINATION | |
|---|---|---|---|
| phase | WCWP [3:2] | bank1 | bank2 |
| 1 | 1 | 01 | I1 [3] | I1 [7] |
| | | 10 | I2 [3] | I2 [7] |
| | | 11 | I3 [3] | I3 [7] | bank3,4 io-low

| MOVE_dest_addr | | DESTINATION | |
|---|---|---|---|
| phase | WCWP [1:0] | bank1 | bank2 |
| 0 | 0 | 00 | io1 [0] | io1 [4] |
| | | 01 | io2 [0] | io2 [4] |
| | | 10 | io3 [0] | io3 [4] |
| | | 11 | io4 [0] | io4 [4] |

| MOVE_dest_addr | | DESTINATION | |
|---|---|---|---|
| phase | WCWP [1:0] | bank1 | bank2 |
| | 1 | 00 | io1 [1] | io1 [5] |
| | | 01 | io2 [1] | io2 [5] |
| | | 10 | io3 [1] | io3 [5] |
| | | 11 | io4 [1] | io4 [5] | bank3,4 io-high

| MOVE_dest_addr | | DESTINATION | |
|---|---|---|---|
| phase | WCWP [1:0] | bank1 | bank2 |
| 1 | 0 | 00 | io1 [2] | io1 [6] |
| | | 01 | io2 [2] | io2 [6] |
| | | 10 | io3 [2] | io3 [6] |
| | | 11 | io4 [2] | io4 [6] |

| MOVE_dest_addr | | DESTINATION | |
|---|---|---|---|
| phase | WCWP [1:0] | bank1 | bank2 |
| 1 | 1 | 00 | io1 [3] | io1 [7] |
| | | 01 | io2 [3] | io2 [7] |
| | | 10 | io3 [3] | io3 [7] |
| | | 11 | io4 [3] | io4 [7] |

FIG. 20

| dest_reg_no | REGISTER TO BE WRITTEN | WINDOW TO BE WRITTEN |
|---|---|---|
| "11xxx" | %i | dest_CWP |
| "10xxx" | %l | dest_CWP |
| "01xxx" | %l | dest_CWP+1 |

FIG. 22

|  | WINDOW TO BE MOVED ||
|  | local | in |
| --- | --- | --- |
| SAVE | move_CWP+2 | move_CWP+3 |
| RESTORE | move_CWP-2 | move_CWP-3 |

FIG. 23

| | |
|---|---|
| sre_phy_addr | PHYSICAL ADDRESS WHEN READ INSTRUCTION IS PROCESSED |
| dest_CWP | CWP WHEN WRITE INSTRUCTION IS PROCESSED |
| dest_phy_addr | PHYSICAL ADDRESS WHEN WRITE INSTRUCTION IS PROCESSED |
| move_CWP | CWP WHEN MOVE PROCESS IS PERFORMED IMMEDIATELY BEFORE SAVE INSTRUCTION OR RESTORE INSTRUCTION IS PRECESSED |
| move_WCWP | WCWP OF DESTINATION OBTAINED FROM TABLE SHOWN IN FIG. 19 WHEN MOVE PROCESS IS PERFORMED IMMEDIATELY BEFORE SAVE INSTRUCTION OR RESTORE IS EXECUTED |

FIG. 25

```
                <PROGRAM>
                    ⋮
              SAVE(a)
              SAVE (b)
                    ⋮
```

<PROCESS TIME CHART UPON EXECUTED OF SAVE INSTRUCTION/RESTORE INSTRUCTION>

SAVE(a)                          ◄----- SAVE ---------►

PHASE=0 MOVE_even_reg            ◄-- MOVE_even --►

PHASE=1 MOVE_odd_reg               ◄-- MOVE_odd --►

SAVE (b)                         ◄----INTERLOCK -►◄-----SAVE -----►

FIG. 27

| phase | ADDRESS OF DESTINATION IN bank OF bank 1, 2 (local) | ADDRESS OF DESTINATION IN BANK OF BANK 3, 4 (OUT) |
|---|---|---|
| 0 | ["00", WCWP[3:2]mod 3+1],<br>["10", WCWP[3:2]mod 3+1] | ["00", (WCWP[1:0] +3)mod 4],<br>["10", (WCWP[1:0] +3)mod 4] |
| 1 | ["01", WCWP[3:2]mod 3+1],<br>["11", WCWP[3:2]mod 3+1] | ["01", (WCWP[1:0] +3)mod 4],<br>["11", (WCWP[1:0] +3)mod 4] |

FIG. 28

| phase | ADDRESS OF DESTINATION IN bank OF bank 1, 2 (local) | ADDRESS OF DESTINATION IN bank OF bank 3, 4 (in) |
|---|---|---|
| 0 | ["00", WCWP[3:2]MOD 3+1],<br>["10", WCWP[3:2]MOD 3+1] | ["00", (WCWP[1:0] -2)mod 4],<br>["10", (WCWP[1:0] -2)mod 4] |
| 1 | ["01", WCWP[3:2]MOD 3+1],<br>["11", WCWP[3:2]MOD 3+1] | ["01", (WCWP[1:0] -2)mod 4],<br>["11", (WCWP[1:0] -2)mod 4] |

FIG. 29

REGISTER FILE IN THE REGISTER WINDOW SYSTEM AND CONTROLLING METHOD THEREOF

BACKGROUND OF THE INVENTION

1. Field of the Invention

The present invention relates to a register access processing method for use with an information processing apparatus having an architecture of a register window and using an out-of-order instruction execution system, the method allowing the order of instructions to be changed so that an instruction goes ahead of a register window switching instruction.

2. Description of the Related Art

Some information processing apparatus having an architecture using a reduced instruction set has a plurality of register sets (hereinafter referred to as register windows). Thus, in the apparatus, it is not necessary to save or restore to a memory stack a register that takes place when a subroutine is called or returned.

The register windows are connected in a ring shape and managed by register window numbers (hereinafter referred to as window numbers). For example, eight register windows are assigned window numbers 0 to 7 and used in the order of 0, 1, 2, . . . , and 7. The window number of a register window that is being used is stored by a register (hereinafter, this register is referred to as current window pointer (CWP)).

FIG. 1 shows the structure of a ring-shaped register file.

Each register window file composed of for example 32 64-bit registers. Among these registers, eight registers are common in all the register windows. As shown in FIG. 1, other eight registers are in common with the immediately preceding register window. Further eight registers are in common with the immediately following register window.

These registers are referred to as overlap register window. There are two types of register window switching instructions that are a SAVE instruction and a RESTORE instruction. The SAVE instruction increments CWP. The RESTORE instruction decrements CWP. Thus, in the following description, the register window switching instructions are referred to as SAVE instruction and RESTORE instruction.

FIG. 1 shows the case that the number n of windows is eight and a total of 136 registers of which eight "local" registers×eight windows=64 registers, eight overlapped in/out registers×eight windows=64 registers, and eight global registers (not shown). It is necessary to allow data to be written and read to and from all the registers.

In the related art, there are problem with respect to speed and scale of a circuit that reads data from such a large register file.

FIG. 2 is a schematic diagram showing the structure of a register file composed of a master register file and a working register file.

As the number of register windows becomes large, a very large register file is required (when the number of register windows is eight, 136 registers are required). As a result, it becomes difficult to supply an operand to an arithmetic unit at high speed. Thus, as shown in FIG. 2, in addition to a register file (portion (51) shown in FIG. 2) that stores all windows as shown in FIG. 2 (the register file is referred to as master register file (MRF)), a subset (portion (52) shown in FIG. 2 (52)) of the MRF is disposed. The subset stores a copy of one window pointed by CWP in the MRF (hereinafter, the subset is referred to as working register file (WRF)). The WRF supplies an operand to the arithmetic unit. Since the WRF stores only a window pointed by CWP, the capacity of the WRF is 32 entries that is smaller than that of the MRF. Thus, data can be read from the WRF at high speed.

However, in such a structure, since the WRF stores only registers for one window, when the SAVE instruction or the RESTORE instruction is executed, an operand that is required after an instruction that will be executed after the SAVE instruction or the RESTORE instruction cannot be supplied from the WRF.

Thus, when the SAVE instruction or the RESTORE instruction is executed, since the window of the WRF is replaced with a new window, since a window transferring process takes place from the MRF to the WRF, while the process is taking place, the execution of instructions that follow is stalled.

In addition, the information processing apparatus that changes the processing order of instructions corresponding to an out-of-order instruction executes the instructions that can be processed regardless of the execution order of the program. However, the apparatus cannot execute an instruction preceded by the SAVE instruction or the RESTORE instruction even if the apparatus can process the instruction, until a window is transferred to the WRF after the SAVE instruction or the RESTORE instruction is executed.

Such a restriction causes the performance of the information processing apparatus corresponding to the out-of-order instruction execution system that generates a large number of instructions at a time to largely deteriorate. The information processing apparatus corresponding to the out-of-order instruction execution system pre-reads many instructions and pre-stores them to buffers. Instructions that are stored and that are executable are executed in the changed order different from that designated by the program so that the throughput of the execution of the instructions is improved. Thus, when the SAVE instruction or the RESTORE instruction is executed, if the execution order of instructions cannot be changed, whenever the SAVE instruction or the RESTORE instruction is executed, the out-of-order processing mechanism does not work. As a result, the performance of the apparatus remarkably deteriorates.

SUMMARY OF THE INVENTION

An object of the present invention is to improve the performance of an information processing apparatus corresponding to out-of-order processing system.

In particular, the present invention allows the execution order to be changed and a large number of instructions to be executed at a time when the SAVE instruction or the RESTORE instruction is executed in an information processing apparatus that uses a register window and out-of-order execution system.

A first aspect of the present invention is a register file having a master register file and a working register file, data used for a process for an instruction being transferred from the master register file and stored in the working register file, data used for a process for an instruction being read from the working register file, comprising a current window pointer unit pointing a current window position for accessing the master register file, a working register window current pointer unit pointing a current window position for accessing working register file, and a unit transferring data from the master register file to the working register file and updating data of the working register file when the current window pointer is changed so that the master register file stores data of all register windows of an information processing apparatus and the working register file stores data of a window pointed by the current window pointer and data of windows followed and preceded by the window pointed by the current window pointer.

A second aspect of the present invention is a method for controlling a register file having a master register file and a working register file, data used for a process for an instruction being transferred from the master register file and stored in the working register file, data used for a process for an instruction being read from the working register file, comprising the steps of providing a current window pointer for pointing a current window position for accessing the master register file and a working register window current pointer for pointing a current window position for accessing working register file, and transferring data from the master register file to the working register file and updating data of the working register file when the current window pointer is changed so that the master register file stores data of all register windows of an information processing apparatus and the working register file stores data of a window pointed by the current window pointer and data of windows followed and preceded by the window pointed by the current window pointer.

According to the present invention, data necessary for reading or writing a plurality of instructions that include the SAVE instruction or the RESTORE instruction is pre-stored in a working register file. Thus, even if instructions are successively read or written, they can be executed without need to wait until data necessary upon execution of the SAVE instruction or the RESTORE instruction is transferred from the MRF to the WRF.

These and other objects, features and advantages of the present invention will become more apparent in light of the following detailed description of a best mode embodiment thereof, as illustrated in the accompanying drawings.

BRIEF DESCRIPTION OF DRAWINGS

FIG. 3 is a schematic diagram for explaining a foreseeing transfer (No. 1);

FIG. 6 is a schematic diagram showing the relation between a CWP and a WP;

FIG. 7 is a schematic diagram showing a method for converting a WCWP and a WP;

FIG. 8 is a schematic diagram for explaining a method for assigning a physical address to a WRF;

FIG. 9 is a schematic diagram showing a method for converting a register number into a physical address (No. 1);

FIG. 11 is a schematic diagram showing a method for performing an updating operation for a WCWP;

FIG. 17 is a schematic diagram showing a method for selecting a bank;

FIG. 18 is a schematic diagram showing a method for mapping a physical address [5:0];

FIG. 19 is a schematic diagram showing a WCWP of a destination;

FIG. 20 is a schematic diagram for explaining registers of a WRF to which data is transferred corresponding to MOVE_dest_addr;

FIG. 22 is a schematic diagram showing the relation between registers and windows in the case that data is written to an MRF;

FIG. 23 is a schematic diagram showing the relation between registers and windows to be moved;

FIG. 25 is a schematic diagram showing meanings of a CWP, a WCWP, and a phy_addr;

FIG. 27 is a time chart of a process performed in the case that the SAVE instruction is successively executed;

FIG. 28 is a schematic diagram for explaining a process for writing data to a bank of a WRF in the case that a SAVE process is performed; and FIG. 29 is a schematic diagram for explaining a process for writing data to a bank of a WRF in the case that a RESTORE process is performed.

DESCRIPTION OF PREFERRED EMBODIMENTS

The present invention provides a register file and a controlling system thereof that allow the execution order of instructions to be changed when an instruction is followed by a window switching instruction in an out-of-order execution system because a working register file stores registers corresponding to a plurality of windows in the structure of which there are two types of files that are a master register file that stores all window registers and a working register file that stores a part of window registers that may be accessed.

Figure 1:
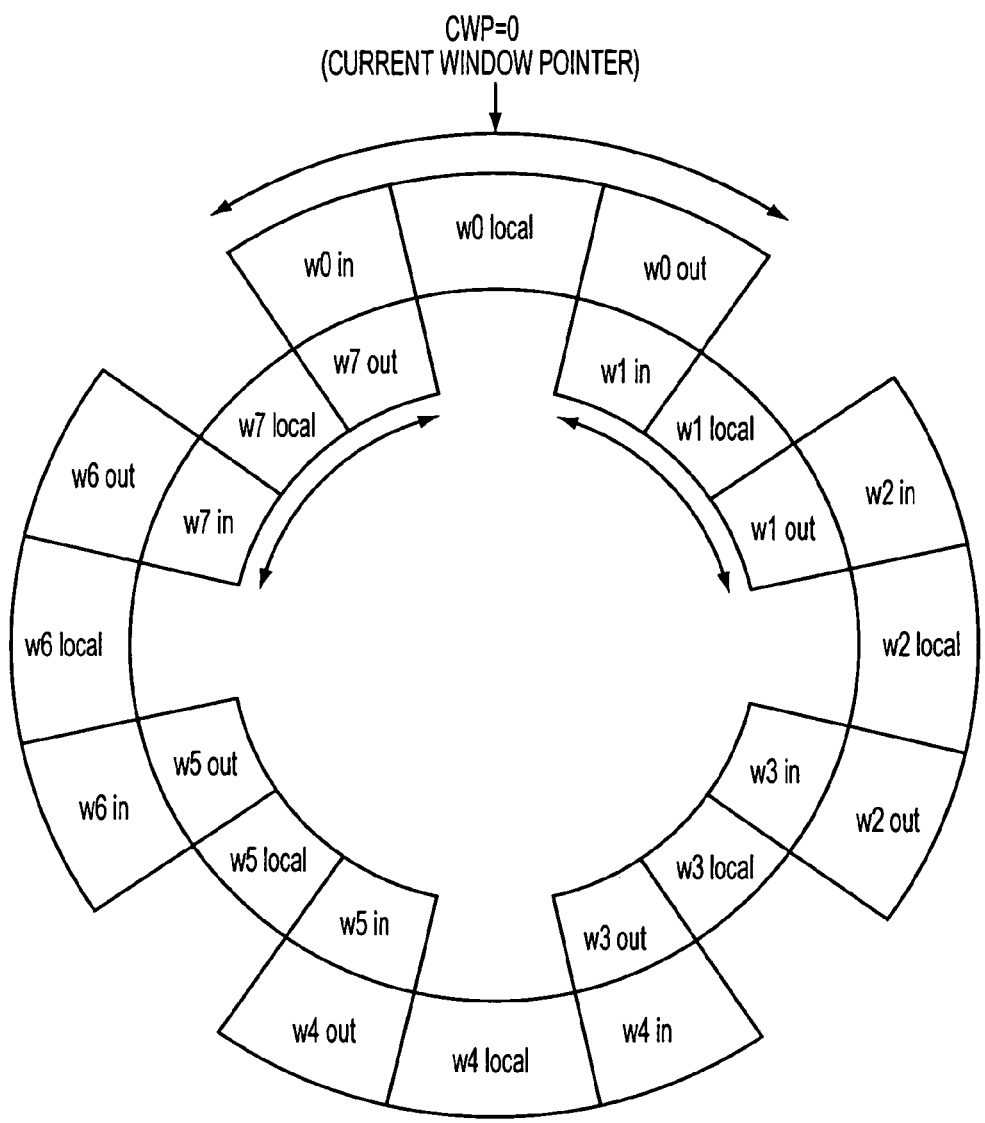
FIG. 1 is a schematic diagram showing the structure of a ring-shaped register file.
Figure 2:
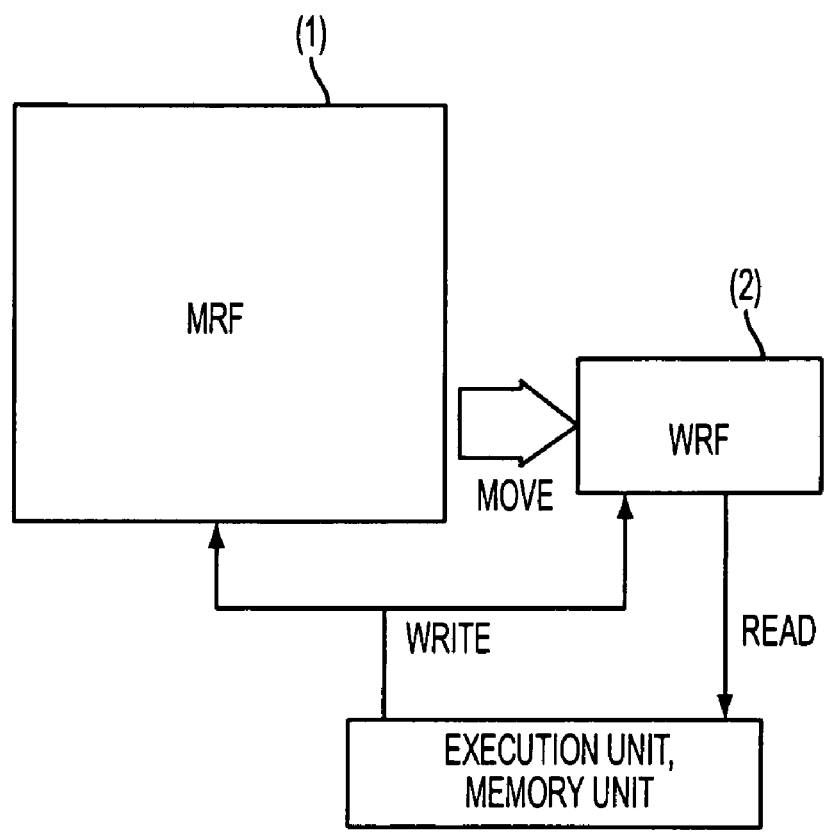
FIG. 2 is a schematic diagram showing the structure of a register file composed of a master register file and a working register file.

Since it is difficult for an information processing apparatus that has a register file storing a large number of windows to read an operand at high speed, as shown in FIG. 2, all the windows are stored in an MRF (portion (51) shown in FIG. 2) and a part of windows is stored in a WRF (portion (52) shown in FIG. 2). An operand is read from only the WRF. An updating process is performed so that the content of the WRF is always the same as the content stored in the MRF. Since an operand is supplied from only the small WRF, it can be read at high speed. When an window switching instruction is executed, the latest value of the switched window is transferred from the master register file.

Only a window of registers pointed by CWP is updated as the result of the execution of an instruction. The window is stored in the WRF. Thus, the updating process can be performed for only the WRF. On the other hand, in such a controlling method, to allow the data of the MRF to be consistent with data of the WRF, when a window is switched, it is necessary to pre-transfer data from the WRF to the MRF. According to the present invention, to omit the process for transferring data from the WRF to the MRF, the WRF and the MRF are updated at a time.

In addition, when such a method is used, a register that can be read as an operand is limited to one in a window pointed by CWP. Thus, in an information processing apparatus corresponding to the out-of-order execution type, the execution order of instructions cannot be changed when an instruction is preceded by the SAVE instruction or the RESTORE instruction.

To solve such a problem, according to an embodiment of the present invention, in addition to a window pointed by CWP, windows pointed by CWP−1 and CWP+1 are stored in the WRF. As a result, since the windows preceded and followed by the window pointed by CWP are stored in the WRF, instructions preceded and followed by the SAVE instruction or the RESTORE instruction can be read from and written to the register file. Thus, instructions can be moved before and after the SAVE instruction or the RESTORE instruction.

When such a WRF is used, one window has 32 registers. Among them, eight registers are in common with all windows (these registers are referred to as global registers). The other eight registers are in common with the immediately following window. The remaining eight registers are in common with the immediately preceding window. Thus, 24 registers of the 32 registers are shared by the other windows. Consequently, to have windows pointed by CWP−1, CWP, and CWP+1, only 64 registers are required.

Next, a WRF that has extra two windows that are followed and preceded by a window pointed by CWP will be described. However, it should be noted that the present invention can be extended to the case that a WRF has 2n extra windows that are followed and preceded by a window pointed by CWP.

When the same window switching instructions such as the SAVE instruction and the SAVE instruction or the RESTORE instruction and the RESTORE instruction are successively executed, since the WRF does not have windows pointed by CWP+2 or CWP−2, an instruction preceded by the second SAVE instruction or the second RESTORE instruction reading and writing data from and to the windows, while the windows are transferred from the MRF, the execution of the next instruction is stalled.

To prevent the execution of the instruction from being stalled, it is assumed that when the first SAVE instruction or the first RESTORE instruction is executed, a window necessary for executing an instruction preceded by the second SAVE instruction or the second RESTORE instruction is pre-transferred from the MRF. After the SAVE instruction is executed, the window pointer becomes CWP+1. When the SAVE instruction is followed by the RESTORE instruction, the window pointer becomes CWP. On the other hand, when the SAVE instruction is followed by the SAVE instruction, the window pointer becomes CWP+2. In any case, a window pointed by CWP−1 is not required. Thus, a window pointed by CWP+2 necessary for the case that the SAVE instruction is followed by the SAVE instruction is transferred from the MRF. This applies to the RESTORE instruction. Thus, when the SAVE instruction or the RESTORE instruction is executed, the following transferring process is performed.

When the SAVE instruction is executed, a window pointed by CWP+2 of the MRF is transferred to a window pointed by CWP−1 of the WRF.

When the RESTORE instruction is executed, a window pointed by CWP−2 of the MRF is transferred to a window pointed by CWP+1 of the WRF.

When such a register window is foresee-transferred, even if the SAVE instruction or the RESTORE instruction is successively executed, the execution of an instruction preceded thereby can be prevented from being stalled. However, there is an exception. In other words, when an instruction preceded by the second SAVE instruction or the second RESTORE instruction becomes executable before the register window foresee-transferring process is performed along with the first SAVE instruction or the first RESTORE instruction, the executable instruction is stalled. In other words, since a window necessary for the executable instruction has not been transferred from the MRF, the instruction is stalled until the window is transferred.

Figure 4:
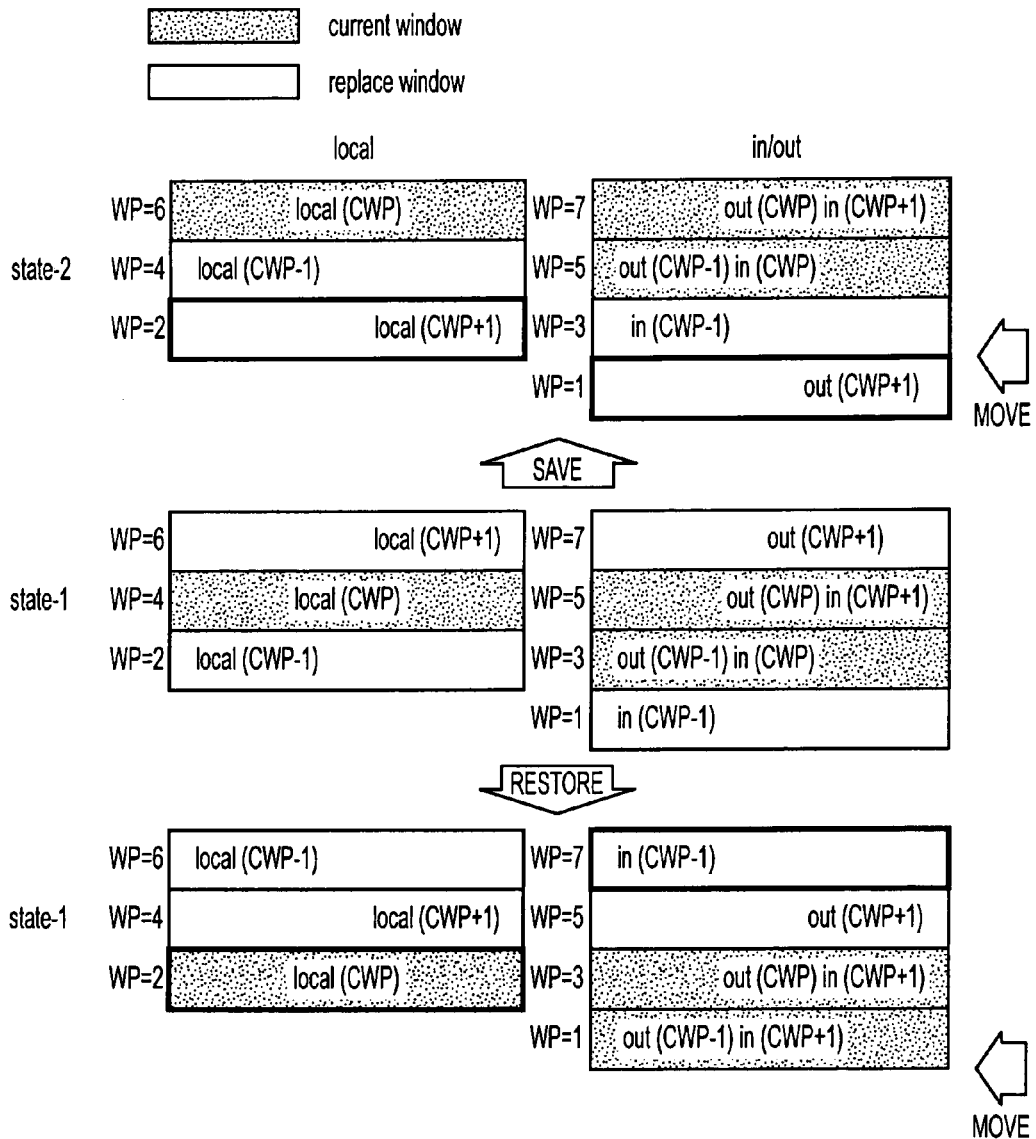
FIG. 4 is a schematic diagram for explaining a foreseeing transfer (No. 2)
Figure 5:
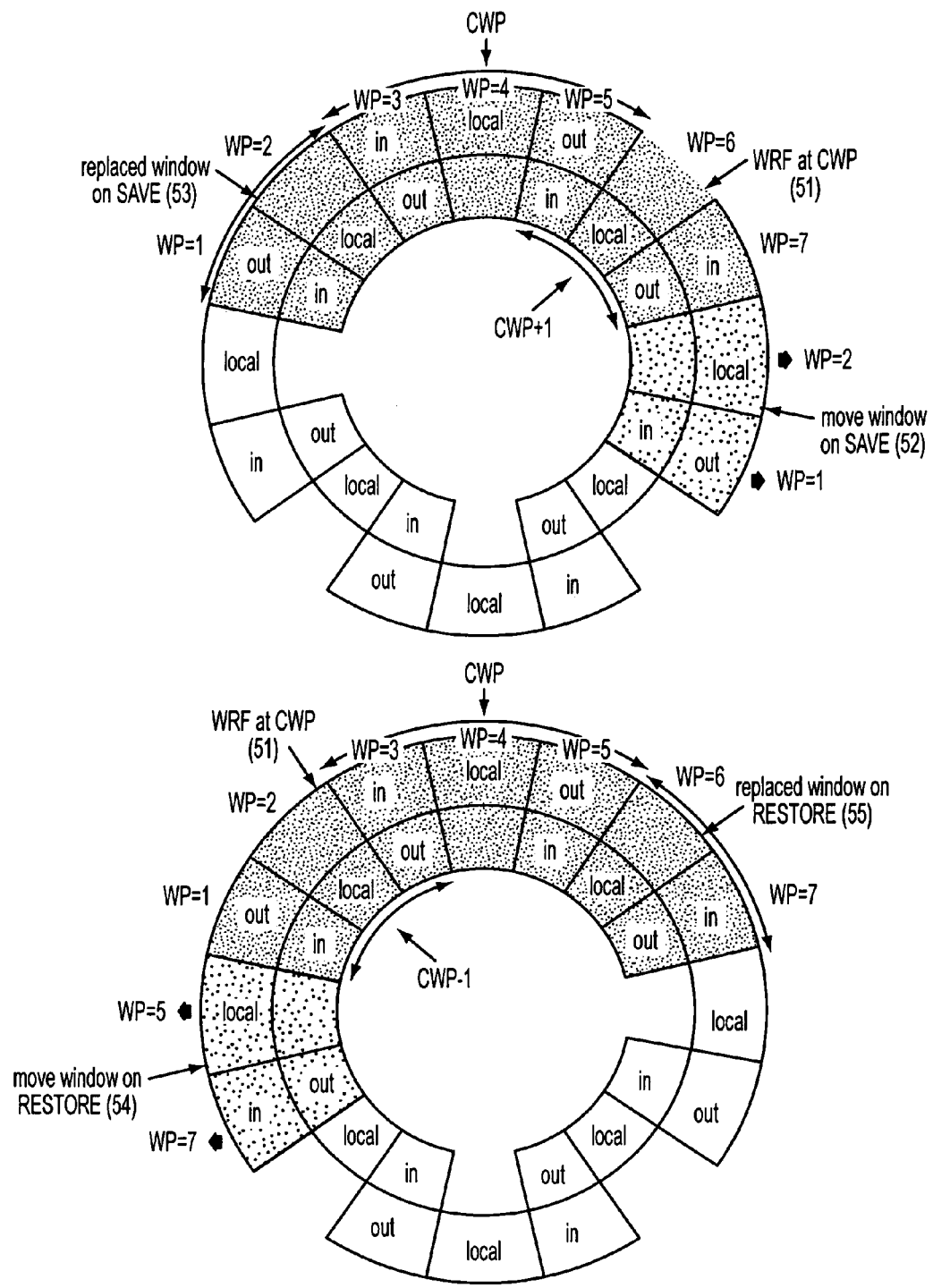
FIG. 5 is a schematic diagram for explaining a foreseeing transfer (No. 3)

FIGS. 3 to 5 are schematic diagrams for explaining a foreseeing transfer.

In the above-described foresee transfer, when the SAVE instruction is executed, a window pointed by CWP+2 is transferred. When the RESTORE instruction is executed, a window pointed by CWP−2 is transferred. However, since register windows are overlap windows, in state-0 shown in FIG. 4, the MRF has an "in" portion pointed by CWP+2 (or an "out" portion pointed by CWP−2) and a "global" portion.

When the SAVE instruction or the RESTORE instruction is executed, it is not necessary to transfer a whole window (32 entries) from the MRF to the WRF. In other words, when the SAVE instruction is executed, only the "out" portion and the "local" portion pointed by CWP+2 can be transferred. When the RESTORE instruction is executed, only the "in" portion and the "local" portion pointed by CWP−2 can be transferred. Thus, only 16 entries that are a half window can be transferred. The foreseeing transfer is performed as shown in FIG. 3.

As shown in FIG. 4, WPs are assigned to "in/out" portions and "local" portions one after the other. To perform a foreseeing transfer, a window should be transferred to a window two positions ahead. Thus, a window is transferred to a window pointed by WP+2. In FIG. 4, since WP start with 1, "mod 7" should be followed by "+1". Thus, for compensation, "−1" is added to "±4" in parenthesis.

Using such a method, although the amount of data transferred from the MRF to the WRF can be decreased, whenever a window switching instruction is executed, the positions of the "in" portion, the "local" portion, and the "out" portion adversely vary.

FIG. 4 is a schematic diagram showing the operation of a WRF.

Frames assigned WP (Window Pointer)=1, . . . , and 7 are composed of eight registers each. A WRF also has a set of registers of a "global" portion (not shown).

FIG. 5 is a schematic diagram showing the state that windows of an MRF are mapped to a WRF. In state-1, a frame of WP=4 stores a "local" portion. A frame of WP=3 stores an "in" portion. A frame of WP=5 store an "out" portion. Likewise, a frame of WP=6 stores a "local" portion pointed by CWP+1. A frame of WP=1 stores an "in" portion pointed by CWP−1. A frame of WP=3 stores an "out" portion pointed by CWP−1. Windows of the WRF are mapped from the MRF. In other words, windows of the MRF are partly mapped to the WRF.

In FIG. 5, portion (51) represents the state that an MRF is mapped to a WRF in the state-1.

When the SAVE instruction is executed, the state-1 advances to state-2. Thus, CWP+1 in the state-1 becomes CWP in the state-2. An "out" portion and a "local" portion pointed by CWP+1 in the state-2 are foresee-transferred from the MRF. Thus, as portions (52) and (53) shown in FIG. 5, frames of WP=1 and 2 are overwritten with data transferred from the MRF. Frames of WP=5, 6, and 7 become those pointed by CWP in the state-2.

When the RESTORE instruction is executed, the state-1 returns to the state-0. Thus, CWP-1 in the state-1 becomes CWP in the state-0. An "in" portion and a "local" portion pointed by CWP-1 in the state-0 are foresee-transferred from the MRF. Thus, as portions (54) and (55) shown in FIG. 5, frames of WP=6 and 7 are overwritten with data transferred from the MRF. Frames of WP=1, 2, and 3 become those pointed by CWP in the state-0.

FIG. 6 is a schematic diagram showing the relation between CWP and WP.

FIG. 6 shows the case that the position of CWP of the WRF is denoted by WP and that the "in" portion, the "local" portion, and the "out" portion pointed by CWP are represented by a set of three elements of WP when the SAVE instruction and the RESTORE instruction are executed. When the SAVE instruction is executed eight times in the state that CWP=0 and WP=[3, 4, 5] shown in FIG. 6, although CWP becomes 0, WP elements become [3, 2, 5]. Thus, after the SAVE instruction is executed, the WP elements vary. Consequently, Thus, with CWP, the WP elements of the "in" portion, the "local" portion, and the "out" portion of the WRF cannot be uniquely designated. Although registers of the MRF can be designated with CWP and reg number, registers of the WRF cannot be designated because of such a reason.

Since the position of CWP in the WRF cannot be uniquely designated, WP that represents the position of CWP in the WRF is stored in a register. That is referred to as WCWP (Working Register Current Window Pointer). WCWP is composed of four bits. WCWP [3:2] represents WP of the position of the "local" portion pointed by CWP. WCWP [1:0] represents WP of the position of the "in" portion pointed by CWP. (WCWP [1:0]+1) mod 4 represents WP of the position of the "out" portion pointed by CWP.

Firstly, WCWP represents the position of the current window in the WRF since it cannot be uniquely obtained with CWP as shown in FIG. 6. When register windows are disposed in the method according to the embodiment, a WCWP register is disposed along with a CWP register. When the SAVE instruction or the RESTORE instruction is executed, an updating process is performed by synchronizing them with CWP in the method that will be described later.

In the related art, when the SAVE instruction or the RESTORE instruction is executed, three portions of the "in" portion, the "local" portion, and the "out" portion should be transferred to a WRF. In contrast, according to the embodiment of the present invention, since the "in" portion and the "out" portion overlap in each window, when the SAVE instruction is executed, only the "out" portion and the "local" portion are transferred. When the RESTORE instruction is executed, only the "in" portion and the "local" portion are transferred. Thus, the amount of data that is transferred can be reduced to ⅔ of the amount of data that is normally transferred. Thus, the positions of the "in" portion, the "out" portion, and the "local" portion dynamically vary in the WRF.

Secondly, WCWP correctly points the current positions of the "in" portion, the "out" portion, and the "local" portion that vary in such a manner. When a pair of (WCWP and reg number) is given, a means for obtaining the positions of the registers in the WRF is accomplished.

FIG. 7 is a schematic diagram showing a method for converting WCWP and WP.

As shown in FIG. 7, WCWP is converted into WP members of the "in" portion, the "local" portion, and the "out" portion shown in FIG. 4. In the example, WP numbers are assigned in the WRF so that the "in/out" portions and the "local" portions take place one after the other. Thus, the WP numbers assigned to "in/out" portions are even numbers, whereas the WP numbers assigned to the "local" portions are odd numbers. Thus, as shown in FIG. 7, the WP number assigned to the "in" portion becomes WCWP [1:0]×2+1. The WP number assigned to the "local" portion becomes WCWP [3:2]×2. The "out" portion is preceded by the "in" portion. Thus, the WP number assigned to the "out" portion becomes ((WCWP [1:0]+1) mod 4)×2+1.

In addition, each WP number of the WRF and eight registers of each WP number are assigned addresses 0 to 63 as WP=1 (8, ..., 15), WP=2 (16, ..., 23), WP=3 (24, ..., 31), ..., and so on. These addresses are referred to as physical addresses. In addition, the "global" portion is assigned to WP=0 (0, ..., 7).

FIG. 8 is a schematic diagram for explaining a method for assigning physical addresses to a WRF. FIGS. 9 an 10 are schematic diagrams showing a method for converting a register number into a physical address.

Physical addresses are assigned to the WRF as shown in FIG. 8.

Figure 10:
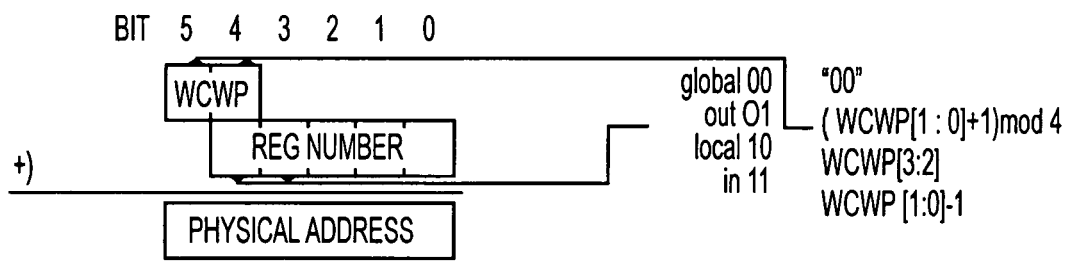
FIG. 10 is a schematic diagram showing a method for converting a register number into a physical address (No. 2)

Normally, a register is accessed using CWP and reg number (register number). However, as was described above, a WRF is accessed using WCWP instead of CWP. When WCWP and reg number are given, a physical address of the register of the WRF is obtained as shown in FIG. 9. A calculation of a physical address shown in FIG. 9 is illustrated in FIG. 10. In FIG. 9, a portion "... x 16" means that WCWP [3:2] (or WCWP [1:0]) is shifted to the left by four bits as shown in FIG. 10.

Next, an example of which a pair of (WCWP, reg number) is converted into a physical address of a WRF will be descried.

Conversion of (WCWP [1:0]="01", r10) into physical address

Since r10 is an "out" portion, corresponding to the second line of FIG. 9, the physical address becomes ((1+1) mod 4)×16+10=42.

Alternatively, with reference to FIGS. 7 and 8, since WP=2×2+1=5 (see FIG. 7), the physical address of r10 of WP=5 is 42 (see FIG. 8).

An expression for obtaining a physical address shown in FIG. 9 can be obtained using the table shown in FIG. 7 as follows. In this example, a physical address of a register of the "out" portion is obtained. However, this method applies for obtaining a physical address of a register of the other portions.

Physical address=WP×8+reg number−8

From the table shown in FIG. 7, physical address= ((WCWP [1:0]+1) mod 4)×2+1)×8+reg number−8

=((WCWP [1:0]+1) mod 4)×16+reg number

This mapping operation is performed when an instruction for accessing a register is decoded. A physical address of each register of the WRF does not vary by the SAVE instruction or the RESTORE instruction as shown in FIG. 4.

Thus, when an instruction is decoded, physical addresses of all registers that the instruction accesses can be decided.

Since the position of CWP varies in the WRF, WCWP that points a register accessed by an instruction does not vary with the SAVE instruction or the RESTORE instruction. Thus, when an instruction is decoded, the physical addresses of all registers accessed by the instruction can be decided.

FIG. 11 is a schematic diagram showing a method for updating WCWP.

Since the position of CWP varies in a WRF, it is necessary to update WCWP that corresponds to CWP when the SAVE instruction or the RESTORE instruction is executed. The updating process is performed as shown in FIG. 11. In this example, since WCWP [3:2]="00" has been assigned to a "global" portion, WCWP [3:2] should vary from "01" to "10" to "11" to "01" and so on. Thus, in WCWP [3:2] shown in FIG. 11, "mod 3" is followed by "+1". Consequently, in the calculation in the left parentheses of "mod 3", "−1" is placed for a compensation.

The updating process should be performed when the SAVE instruction or the RESTORE instruction is fetched. This is because when an instruction is fetched after the SAVE instruction or the RESTORE instruction has been executed, WCWP that has been updated is required.

In contrast, the foreseeing transfer from the MRF to the WRF should not be performed until all instructions that followed by the SAVE instruction or the RESTORE instruction have been executed. This is because in instructions followed by the SAVE instruction or the RESTORE instruction, a branch, an interrupt, and so forth take place and thereby a control path varies. Thus, there is a possibility of which the SAVE instruction or the RESTORE instruction is not executed.

Figure 12:
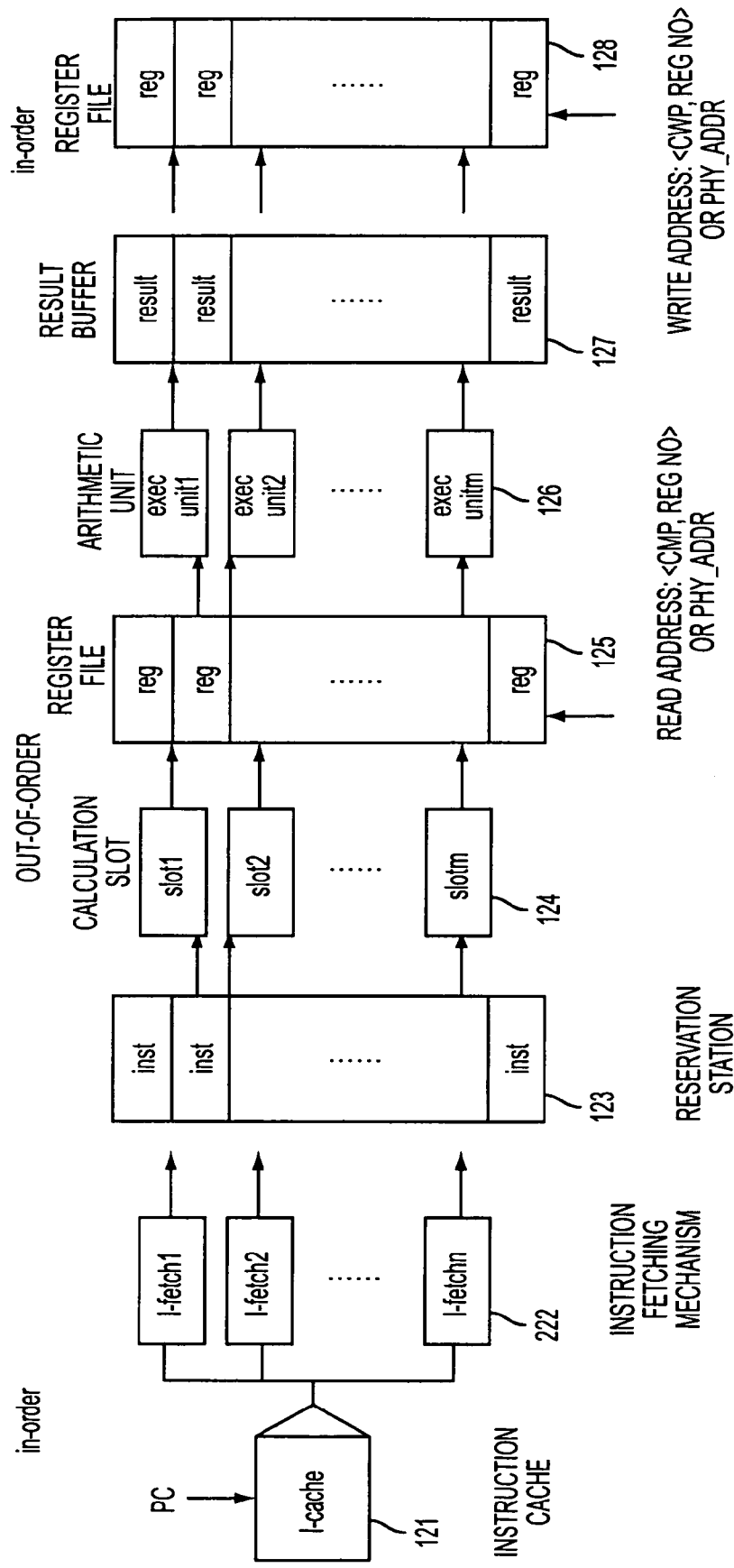
FIG. 12 is a schematic diagram for explaining a process for an instruction performed by a computer corresponding to out-of-order instruction execution system according to an embodiment of the present invention.

FIG. 12 is a schematic diagram for explaining a process for an instruction by a computer corresponding to out-of-order instruction execution system according to an embodiment of the present invention.

N instructions are simultaneously fetched by a plurality of instruction fetching mechanisms 122 from an instruction cache 121 and stored to a reservation station 123. These processes are performed in order. The reservation station 123 removes the dependency of the instructions stored therein. Until calculation slots 124 become idle, these instructions are stored in the reservation station 123. An instruction that can be calculated is supplied to a calculation slot 124. An operand is read from a register file 125. The instruction is executed by an arithmetic unit 126. The instructions are supplied from the reservation station 123 to the calculation slots 124 out of order regardless of the order of the instructions of the original program. After the calculation has been completed, the result is stored in a result buffer 127. Thereafter, the calculated result stored in the result buffer is written to a register file 128 in order of the instructions of the original program.

In FIG. 12, the register file 125 is the same as the register file 128.

When the present invention is applied to the computer that has the out-of-order instruction processing mechanism shown in FIG. 12, a remarkable effect can be achieved.

Figure 13:
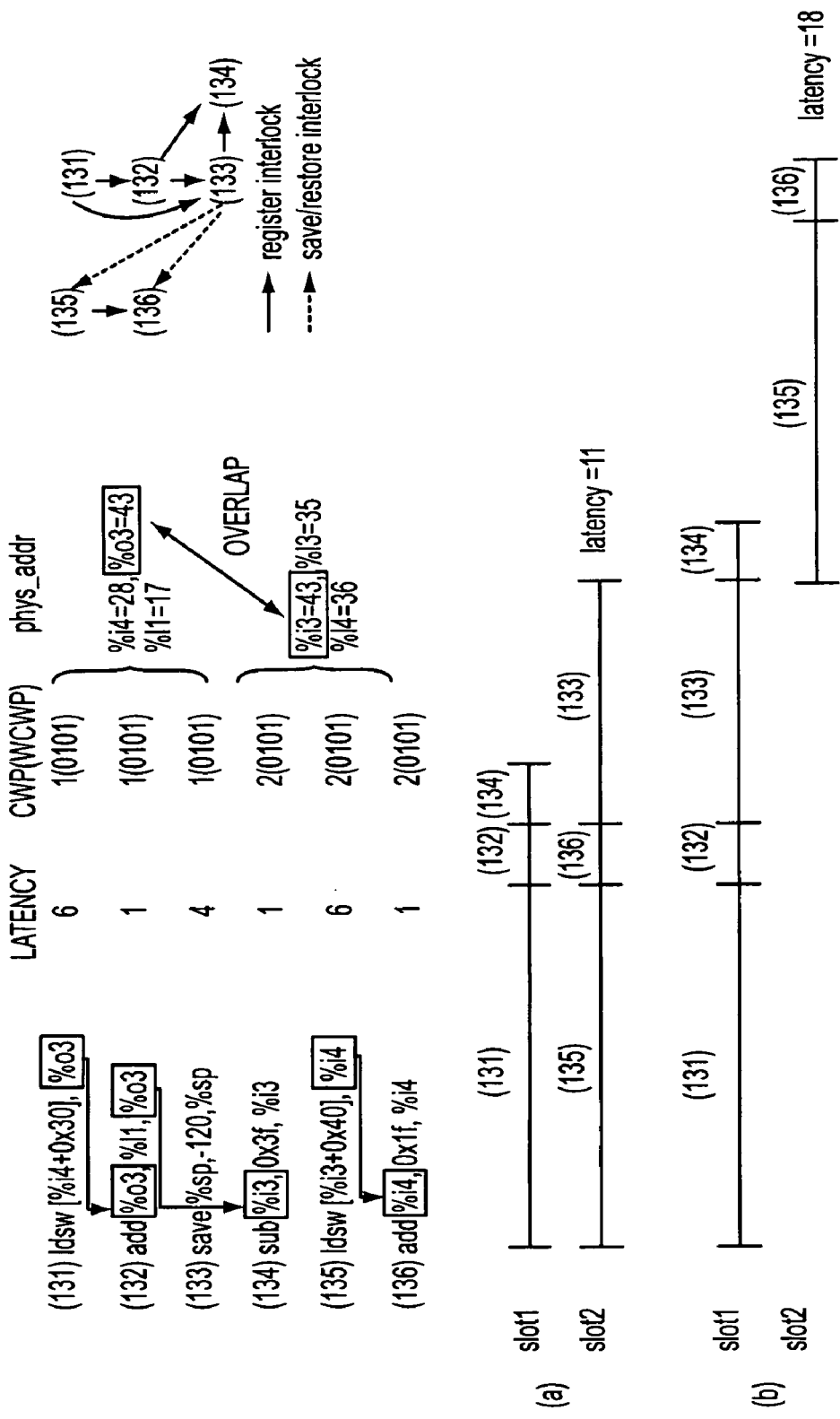
FIG. 13 is a schematic diagram showing the state of which instructions are executed out of order.

FIG. 13 is a schematic diagram showing the state that instructions are executed out of order.

Next, an instruction sequence on the upper left of FIG. 13 will be exemplified. In this example, it is assumed that the number m of instruction slots is 2.

In the instruction sequence shown in FIG. 13, there are interferences of registers from instruction (131) to instruction (132), from instruction (132) to instruction (134), and from instruction (135) to instruction (136).

In addition, the instruction (133) is interlocked by the preceding instructions (131) and (132). This is because when the SAVE instruction (133) is executed, a window is transferred from the MRF to the WRF. Thus, when the SAVE instruction (133) is executed before the instructions (131) and (132) are executed, they will be trapped later. When it becomes clear that the instruction (133) is not executed, it cannot be cancelled.

Such a restriction is denoted by a solid line on the upper right of FIG. 13. When such a restriction is satisfied and the process is performed in the shortest time, the instructions are executed in sequence (a) shown in FIG. 13.

In contrast, according to the related art of which the WRF has only one window pointed by CWP, until an instruction followed by the SAVE instruction has been executed, data cannot be transferred from the MRF to the WRF. Until data has been transferred from the MRF to the WRF, an instruction preceded by the SAVE instruction cannot be executed. As a result, interlocks of {instruction followed by instruction (133)}−>instruction (133) and instruction (133)−>{instruction preceded by instruction (133)} take place. The instruction sequence shown on the upper left of FIG. 13 has such interlocks as a restriction denoted by a curved line on the upper right of FIG. 13.

However, since %o3 of an instruction followed by the SAVE instruction overlaps with %i3 of an instruction preceded by the SAVE instruction, when a technology for dynamically substituting reg numbers of the "in/out" portions is used in the related art, no interlocks take place. In this case, an interlock from the instruction (133) to the instruction (134) does not take place.

When the restriction of the related art is satisfied and the process is performed in the shortest time, the instructions are executed in the sequence (b) shown in FIG. 13.

The latency of the sequence (a) shown in FIG. 13 is 11. In contrast, the latency of the sequence (b) shown in FIG. 13 is 18. Thus, according to the embodiment, the latency is improved by 7 against the related art.

CWP and WCWP of each instruction are shown on the right of the instruction sequence on the upper left of FIG. 13. Before the SAVE instruction (133) is executed, CWP and WCWP are 1 and 0101, respectively. After the SAVE instruction has been executed, CWP and WCWP vary to 2 and 1010, respectively.

The registers used in the instructions (131) and (132) followed by the SAVE instruction are %i4, %o3, and %l1. On the other hand, the registers used in the instructions (134), (135), and (136) preceded by the SAVE instruction are %i3, %l3, and %l4. When the registers are converted into physical addresses corresponding to the table shown in FIG. 9, before the SAVE instruction is executed, the physical addresses of the registers %i4, %o3, and %l1 become 28, 43, and 17, respectively. After the SAVE instruction has been executed, the physical addresses of the registers %i3, %l3, and %l4 become 43, 35, and 36, respectively.

The registers of an instruction preceded and followed by the SAVE instruction can be accessed by common physical addresses. The positions of the registers in the WRF does not vary before and after the SAVE instruction is executed. For example, since %o3 of an instruction followed by the SAVE instruction overlaps with %i3 of an instruction preceded by the SAVE instruction, they can be accessed with the same physical address (=43) in the WRF.

The fact that physical address does not vary in a WRF before and after the SAVE instruction or the RESTORE instruction is executed is important to execute instructions out of order.

Even if a WRF can have all registers necessary before and after the execution of the SAVE instruction and an operand can be supplied to an instruction preceded by the SAVE instruction without need to wait until the next window is transferred from the MRF, when physical addresses of the registers vary after and before the SAVE instruction is executed, it is difficult to move an instruction through the SAVE instruction.

In the method according to the embodiment, unless physical addresses of registers varies, when the instruction (132) is fetched as shown in FIG. 12, the physical addresses are calculated. When the calculated physical addresses are registered to the reservation station, even if instructions are executed in any order, correct registers therefore can be accessed.

Figure 14:
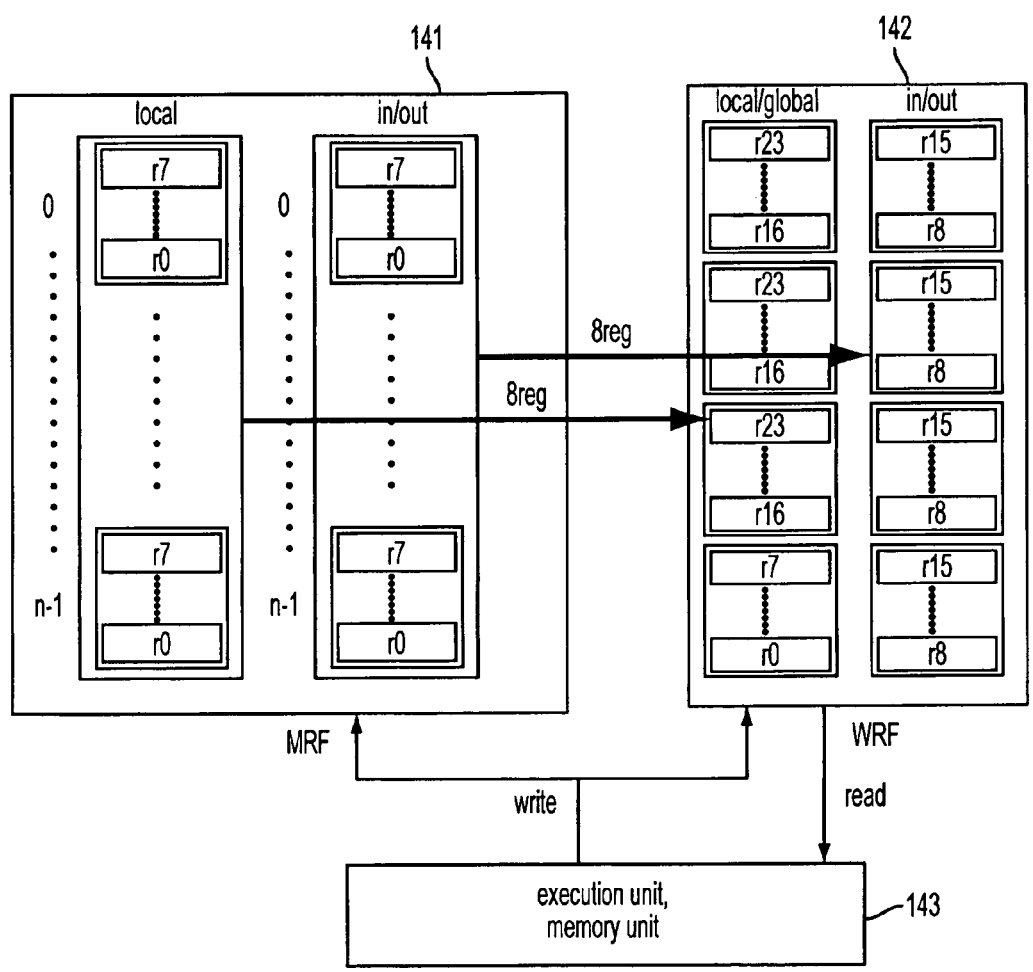
FIG. 14 is a block diagram showing a window register file composed of n windows according to an embodiment of the present invention.

FIG. 14 is a block diagram showing a window register file composed of n windows according to an embodiment of the present invention.

In FIG. 14, reference numeral 141 is an MRF that has "local" portions and "in/out" portions for n windows. In FIG. 14, reference numeral 142 is an WRF. In the WRF, a "global" portion is composed of eight entries, a "local" portion is composed of 24 entries, and an "in/out" portion is composed of 32 entries. Thus, the WRF is composed of a total of 64 entries.

An operand and stored data are supplied from only the WRF to an execution unit and a memory unit designated by 143 in FIG. 14. In contrast, a calculated results and/or a loaded result of the execution unit and the memory unit are written to both the MRF and the WRF. As a result, the content of the MRF becomes consistent with the content of the WRF.

The WRF is accessed through a window pointer WCWP [3:0].

Register data of a total of 16 entries of one window (eight entries) of the "local" portion and one window (eight entries) of the "in/out" portion of the MRF is foresee-transferred to the WRF through a transfer path.

After all instructions followed by the SAVE instruction or the RESTORE instruction have been executed, when the SAVE instruction is executed, the "out" portion pointed by CWP+2 (=the "in" portion pointed by CWP+3) and the "local" portion pointed by CWP+2 are transferred to unused windows of the WRF. In contrast, when the RESTORE instruction is executed, the "in" portion and the "local" portion pointed by CWP−2 are transferred to unused windows of the WRF.

According to an embodiment of the present invention, a total of 136 entries of registers ("in" portion, "out" portion, "local" portion, and "global" portion) of eight windows are provided. Among these registers, 128 registers of the "in" portion, the "out" portion, and the "local" portion are disposed in the master register file (MRF). These registers are always updated so that the contents thereof store the latest values. In contrast, an operand is supplied to the arithmetic unit from the working register file (WRF) rather than the MRF. In addition, a "global" portion for which a window is not switched is disposed in the WRF.

Working Register File (WRF)

The WRF accesses three windows pointed by CWP, CWP−1, and CWP+1 (a total of 64 entries) through a six-bit physical address.

A window pointed by CWP varies in the WRF. A four-bit WCWP (Working Register Current Window Pointer) register is disposed so as to designate a window pointed by CWP. WCWP [3:2] uses WCWP instead of CWP of the "local" portion.

When all registers are accessed, a six-bit physical address obtained with a reg number and WCWP corresponding to the table shown in FIG. 9 is used.

Figure 15:
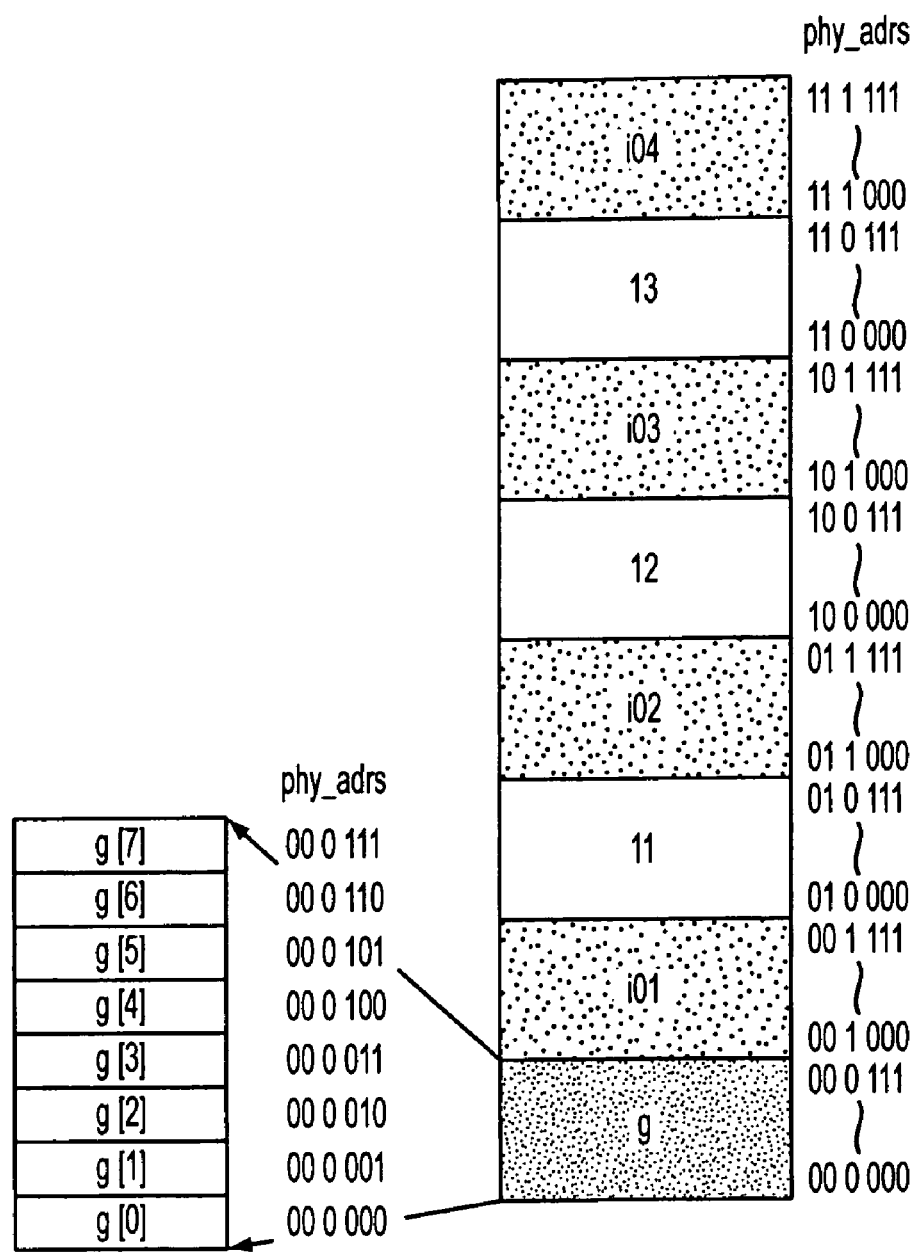
FIG. 15 is a schematic diagram showing a method for mapping a physical address to a WRF.

FIG. 15 is a schematic diagram showing a method for mapping a physical address to a WRF.

64 entries of a WRF are grouped as g, l1, l2, l3, io1, io2, io3, and io4, each of which is composed of eight entries and mapped to physical addresses as shown in FIG. 15.

Figure 16:
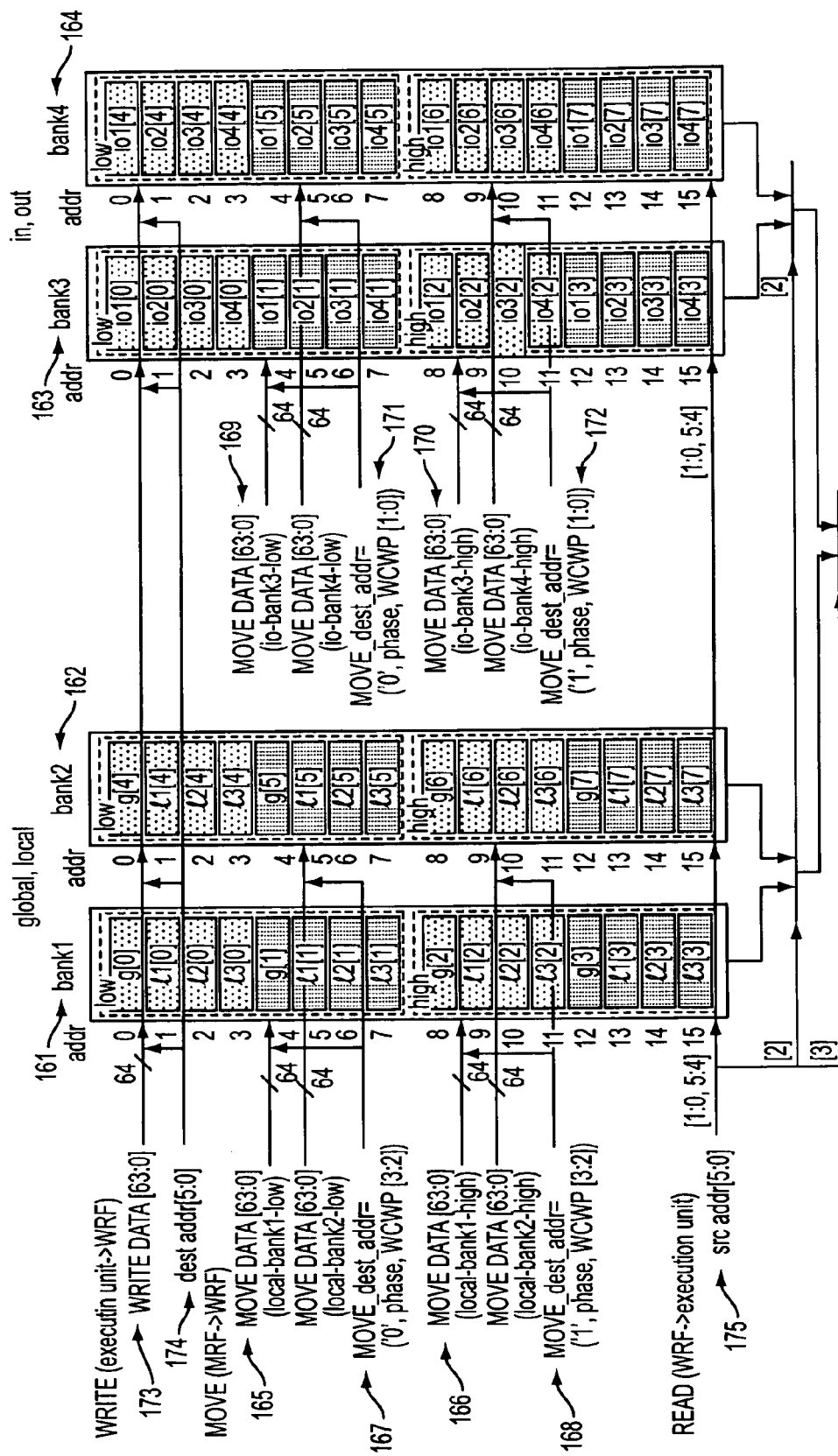
FIG. 16 is a block diagram showing the structure of a WRF.

FIG. 16 is a block diagram showing the structure of a WRF.

In FIG. 16, 64 entries of registers are grouped as four 16-entry modules as shown in FIG. 16.

The WRF is operated by three types of operations READ (WRF->execution unit), WRITE (execution unit->WRF), and MOVE (MRF->WRF). The MOVE operation is performed in association with the SAVE instruction or the RESTORE instruction. The READ operation and the WRITE operation (173) are executed with physical addresses denoted by (175) and (174) shown in FIG. 16. The 16-entry modules denoted by (161), (162), (163), and (164) shown in FIG. 16 are denoted by banks 1, 2, 3, and 4, respectively. The bank 1 has %g0 to %g3 (%l0 to %l3); the bank 2 has %g4 to %g7 (%l4 to %l7); bank 3 has %i0 to %i3; and the bank 4 has %i4 to %i7 (%o4 to %o7).

FIG. 17 is a schematic diagram showing a method for selecting a bank. FIG. 18 is a schematic diagram showing a method for mapping a physical address [5:0].

A bank to or from which data is written or read is decided by bits [3:2] of a physical address corresponding to the table shown in FIG. 17. An address in a bank is decided by bits [1:0] and [5:4].

Each bit of a physical address in the table shown in FIG. 10 has the meaning shown in FIG. 18.

Thus, when a physical address is given, the WRF is accessed in such a manner that a bank is decided by the bits [3:2] of the physical address, a four-bit address of the bank is generated with the bits [1:0] (as high order bits) and bits [5:4] (as low order bits) of the physical address, and a register is accessed to the bank with the generated bank address.

FIG. 19 is a schematic diagram showing WCWP of the destination. When the MOVE operation is performed, with instructions denoted by (167), (168), (171), and (172) shown in FIG. 16, an address in a bank to which data is transferred is designated. WCWP [3:2] designates the designation for the "local" portion. WCWP [1:0] designates the designation for the "in/out" portions. WCWP of the designation is decided corresponding to the table shown in FIG. 19.

When a window is transferred from the MRF to the WRF, since it is foresee-transferred, when the SAVE instruction is executed, a window pointed by WCWP+2 is accessed. When the RESTORE instruction is executed, a window pointed by WCWP−2 is accessed. In addition, since WCWP [3:2]="00" is assigned to a window of the "global" portion, it is necessary to cause WCWP [3:2] to vary from "01" to "10" to "11" to "01" and so on. Thus, WCWP [3:2] shown in FIG. 19 is "mod 3" followed by "+1". Thus, in the calculation in the parentheses on the left of "mod 3", "−1" is placed for a compensation.

In contrast, when the SAVE instruction is executed, it is necessary to transfer the "out" portion of a window that is two positions ahead. However, since WCWP [1:0] is a pointer that points an "in" portion, it points an "in" portion that is three positions ahead and that overlaps with an "out" portion that is three positions ahead. As a result, in this case, the "in" portion is transferred.

In addition, when the MOVE operation is performed, instructions denoted by (165), (166), (169), and (170) in FIG. 16 are transferred in two phases so as to reduce the path width.

In phase=0, even reg numbers (l [0], l [2] l [4], l [6], io [0], io [2], io [4], and io [6]) are transferred.

In phase=1, odd reg numbers (l [1], l [3], l [5], l [7], io [1], io [3], io [5], and io [7]) are transferred.

A destination address, MOVE_dest_addr, that is necessary in the WRF when the MOVE operation is performed is composed of a total of four bits that are the high order two bits that designate the high/low of the bank and represent the phase and the low order two bits are WCWP [3:2] (or WCWP [1:0]).

FIG. 20 is a schematic diagram for explaining registers of WRF to which data is transferred corresponding to MOVE_dest_addr.

MOVE_dest_addr is composed of a total of four instructions that are two instructions denoted by (167) and (168) for accessing "local" portions of banks 1 and 2 and two instructions denoted by (171) and (172) for accessing "out" portions of banks 3 and 4. With MOVE_dest_addr, registers are accessed corresponding to the table shown in FIG. 20.

When the MOVE operation is performed, an instruction denoted by (165) shown in FIG. 16 is written to a register represented by an address in a bank designated by an instruction denoted by (167) shown in FIG. 16 of bank 1, 2–low. An instruction denoted by (166) shown in FIG. 16 is written to a register represented by an address in a bank designated by an instruction denoted by (168) shown in FIG. 16 in bank 1, 2–high. An instruction denoted by (169) shown in FIG. 16 is written to a register represented by an address in a bank represented by the instruction denoted by (171) shown in FIG. 16 of bank 3, 4—low. An instruction denoted by (170) shown in FIG. 16 is written to a register represented by an address in a bank represented by the instruction denoted by (172) shown in FIG. 16 of bank 3, 4—high.

Even if the register numbers are transferred in two phases, since these operations can be pipelined as will be described later, the process latency increases only by one.

Master Register File (MRF)

Figure 21:
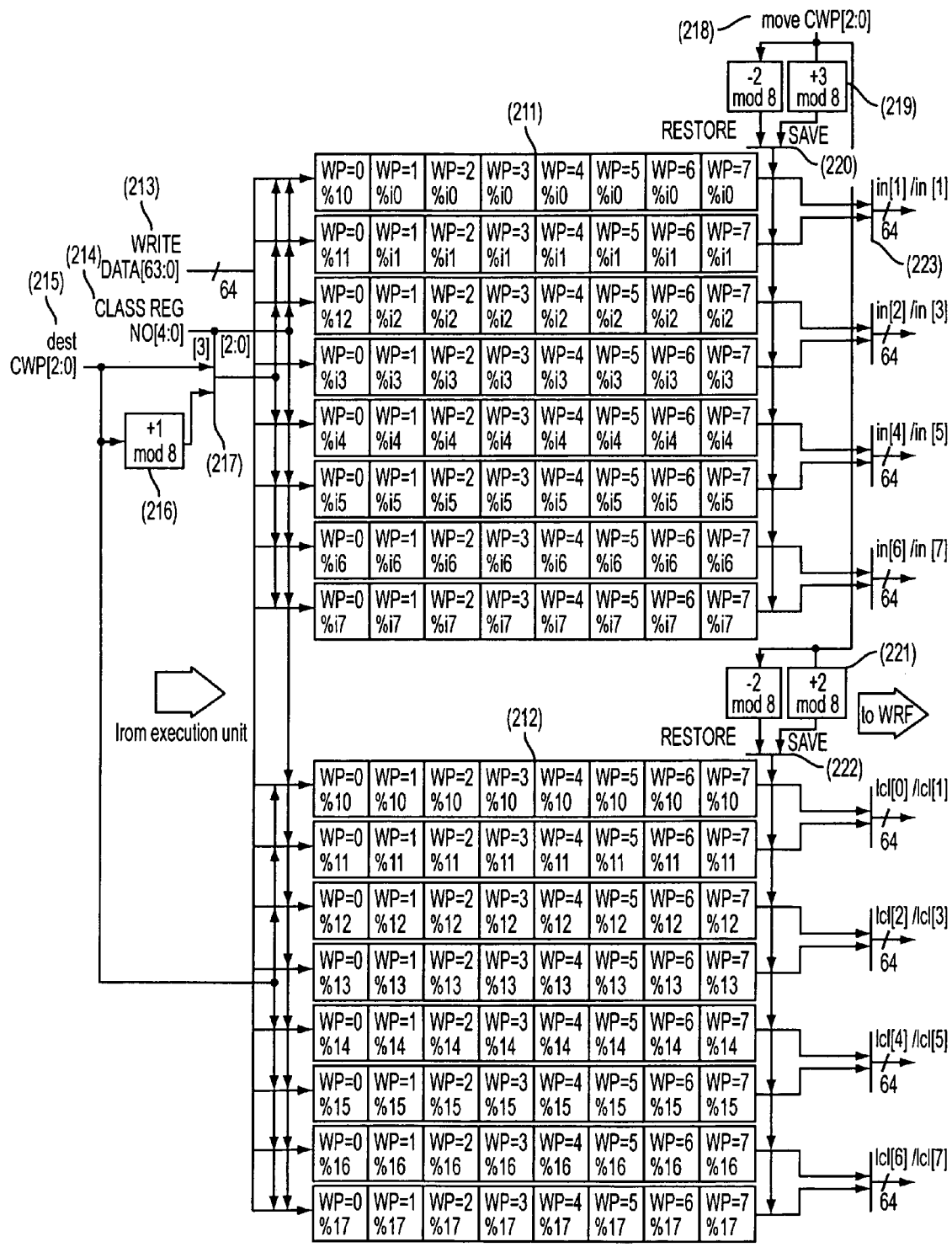
FIG. 21 is a block diagram showing the structure of an MRF according to an embodiment of the present invention.

FIG. 21 is a block diagram showing the structure of an MRF according to an embodiment of the present invention. FIG. 22 is a schematic diagram showing the relation between registers and windows in the case that data is written to the MRF.

The MRF is divided into two areas that are an area for storing "in/out" portions of all windows (this area is denoted by (211) in FIG. 21) and an area for storing "local" portions of all windows (this area is denoted by (212) in FIG. 21). In the MRF, the WRITE operation and the MOVE operation are performed. Unlike with a WRF, in the MRF, a window position can be decided by CWP. Thus, when a window is accessed in the MRF, CWP is used (with instructions denoted by (215) and (218) shown in FIG. 21).

As shown in FIG. 22, the destination of data to be written by the WRITE operation (213) in the MRF depends on a reg number (an instruction designated by (214) shown in FIG. 21) represented in a dest reg field of an instruction for updating a register. This process is accomplished by selecting dest_CWP or dest_CWP+1 with instructions denoted by (216) and (217) shown in FIG. 21.

FIG. 23 is a schematic diagram showing the relation between registers and windows in the case that data is written to the MRF.

When the MOVE operation is performed, a register to be read depends on whether the SAVE instruction or the RESTORE instruction is executed as shown in FIG. 23. As was described above, since a register window is foresee-transferred from the MRF to the WRF, a window to be transferred is a window one position ahead of a window switched by the SAVE instruction or the RESTORE instruction. When the SAVE instruction is executed, a register window is transferred from move_CWP+2 in the MRF. When the RESTORE instruction is executed, a register window is transferred from move_CWP−2 in the MRF. However, when the SAVE instruction is executed, it is necessary to transfer the "out" portion of move_CWP+2. However, since the "out" portion of move_CWP+2 overlaps with the "in" portion of move_CWP+3, on the basis of the "in" portion, registers of the "in" portion transferred when the SAVE instruction is executed becomes move_CWP+3 as shown in FIG. 23.

This process is accomplished by selecting move_CWP−2, move_CWP+2, or move_CWP+3 with instructions denoted by (219), (220), (221), and (222) shown in FIG. 21.

An instruction denoted by (223) shown in FIG. 21 causes registers with even reg numbers to be read from the MRF in phase=0 and registers with odd reg numbers to be read from the MRF in phase=1.

Eight registers are read from a read port denoted by (223) shown in FIG. 21. The output of the read port is connected to portions denoted by (215), (216), (219), and (220) shown in FIG. 16.

Figure 24:
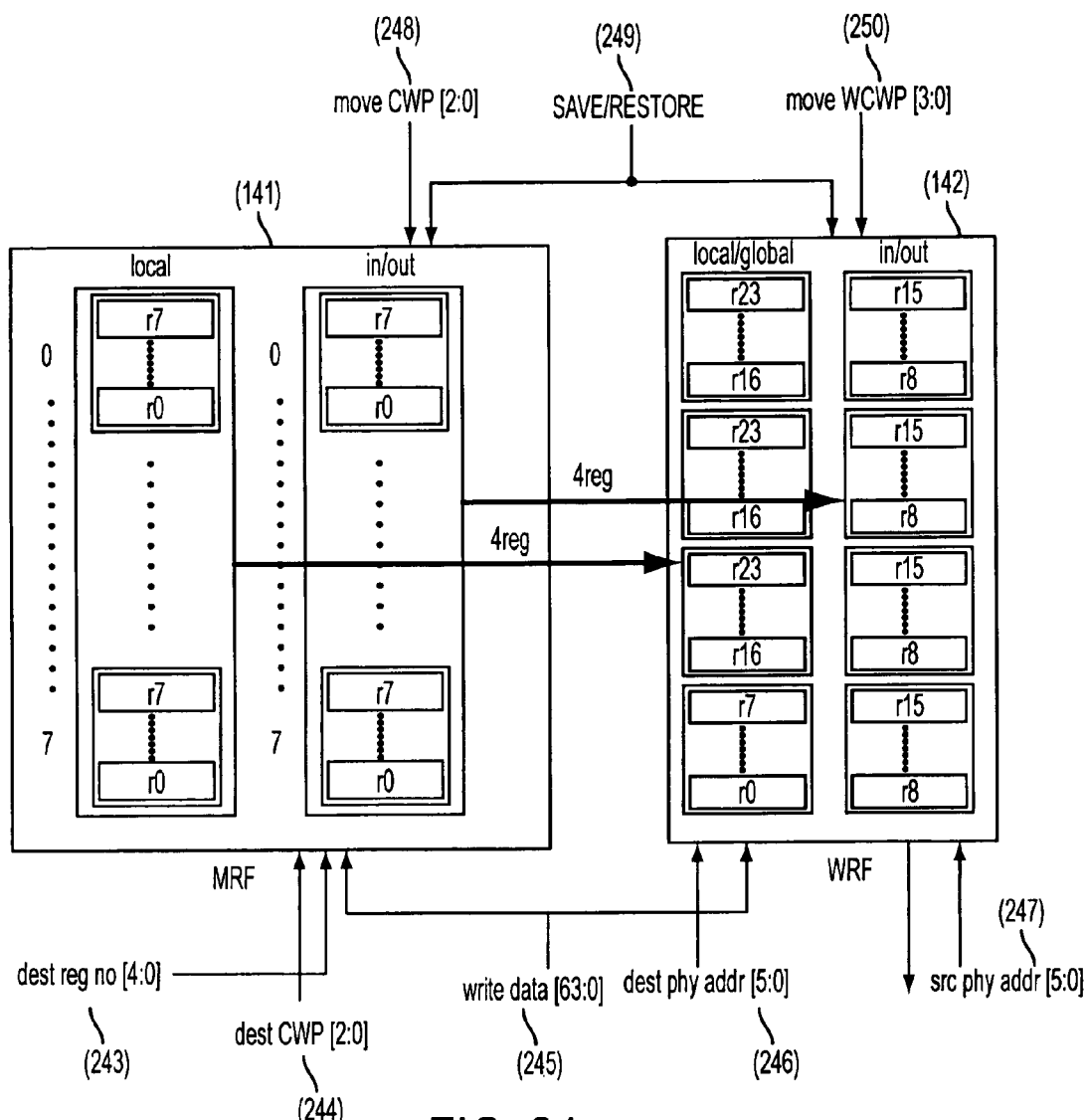
FIG. 24 is a block diagram showing a window register file of which an MRF and a WRF are connected according to an embodiment of the present invention.

FIG. 24 is a block diagram showing the structure of a window register file of which an MRF and a WRF are connected according to an embodiment of the present invention.

In FIG. 24, a portion denoted by (141) represents an MRF and a portion denoted by (142) represents a WRF. In FIG. 24, instructions denoted by (243) and (244) designate a write reg number and CWP, respectively. When data is written to the WRF, (245) dest_phy_addr denoted by (246) shown in FIG. 24 is used instead of a pair of (dest_CWP, reg number).

When data is read from the WRF, it is accessed with src_phy_addr denoted by (247) shown in FIG. 24.

When a SAVE instruction or a RESTORE instruction denoted by (249) shown in FIG. 24 is executed, move_CWP or move_WCWP denoted by (248) shown in FIG. 24 is designated.

A READ operation, a WRITE operation, and a MOVE operation for such a register are processed out of order. Thus, different values are used for dest/move_CWP denoted by (244) and (248) shown in FIG. 24, move_WCWP denoted by (250) shown in FIG. 24, and dest/src_phy_addr denoted by (246) and (247) shown in FIG. 24 depending on each instruction to be executed. CWP, WCWP, and phy_addr for each instruction is stored in the reservation station 123 shown in FIG. 12 along with instructions that are queued. When an instruction that is queued is executed, CWP, WCWP, and phy_addr are read and used.

FIG. 25 is a schematic diagram showing meanings of CWP and WCWP.

FIG. 25 tabulates the meanings of CWP and WCWP that have been described.

Save/Restore Process

Figure 26:
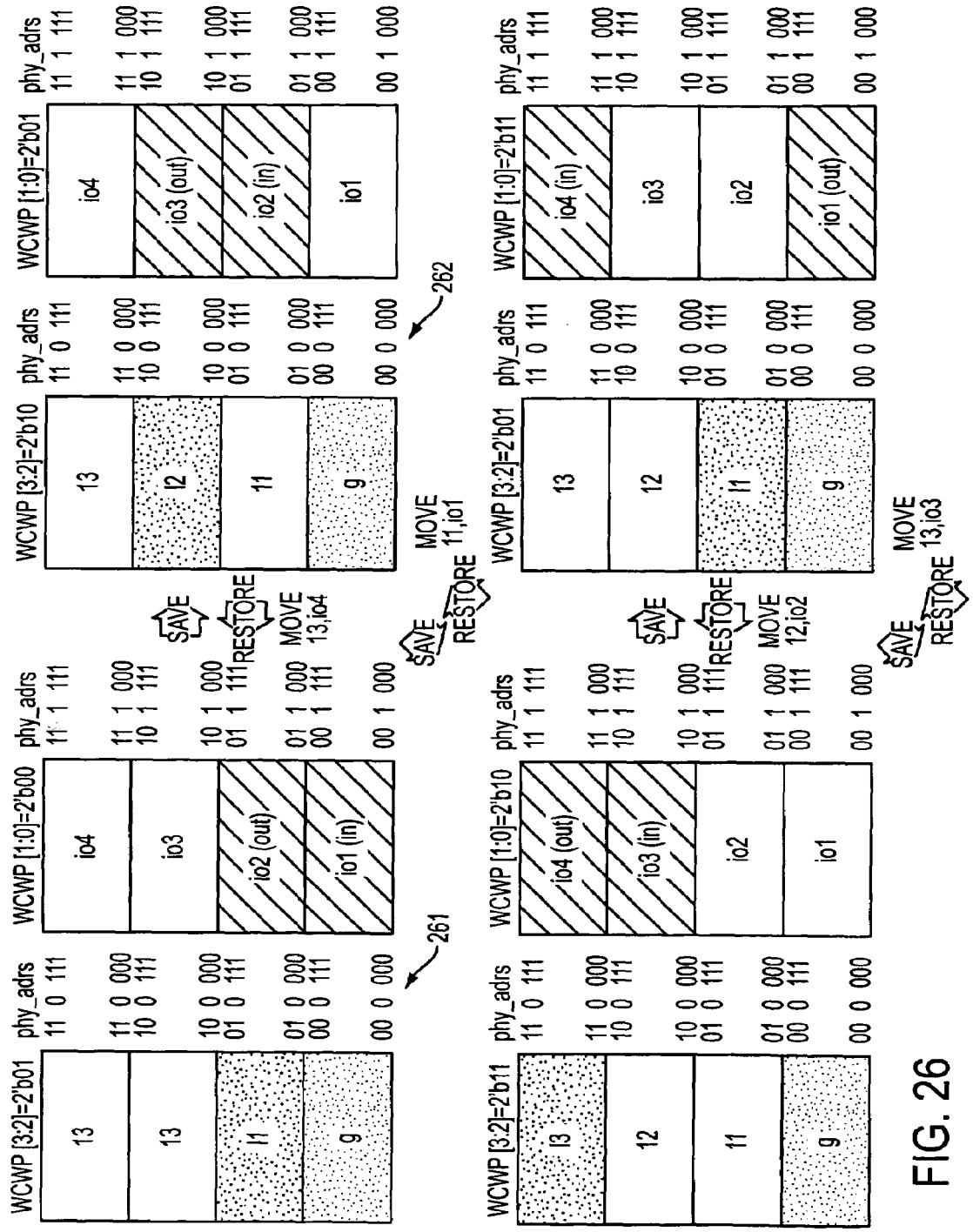
FIG. 26 is a schematic diagram showing the state that a foreseeing transfer is performed for a WRF.

FIG. 26 is a schematic diagram showing the state of a foreseeing transfer performed for the WRF.

When the SAVE process or the RESTORE process is performed, as shown in FIG. 26, the current window of the WRF is changed.

This operation is accomplished by changing WCWP in the manner that will be described later.

When the SAVE process or the RESTORE process is performed one time, only WCWP is changed. However, when the SAVE process or the RESTORE process is successively performed, it is necessary to transfer a new window from the MRF.

Thus, when the SAVE process or the RESTORE process is performed, a new window is transferred from the MRF so that the SAVE process or the RESTORE process can be performed next time.

For example, in state denoted by (261) shown in FIG. 26, WCWP="0100", "local"=l1, in =i01, and out=io2 are mapped. When the SAVE instruction is executed in the state, the "local" portion pointed by CWP+2 is transferred to 13. In addition, the "out" portion pointed by CWP+2 is transferred to io4. As a result, in state denoted by (262) shown in FIG. 26 takes place. In the state denoted by (262), WCPW="1001", "local"=l2, in =io2, and out=io3 are mapped.

In contrast, when the RESTORE instruction is executed in the state denoted by (262) shown in FIG. 26, the "local" portion pointed by CWP-2 is transferred to 13. In addition, the "in" portion pointed by CWP-2 is transferred to io4. As a result, the state denoted by (262) returns to the state denoted by (261) shown in FIG. 26.

When the SAVE instruction is executed, it is necessary to transfer the "local" portion and the "out" portion pointed by CWP+2 from the MRF. When the RESTORE instruction is executed, it is necessary to transfer the "local" portion and the "in" portion pointed by CWP-2 from the MRF.

To do that, a 512-bit (eight bytes×eight words) MOVE BUS is routed between the MRF and the WRF so as to transfer register data from the MRF to the WRF. To transfer one window, it is necessary to transfer 16 entries. In the example, the 16 entries are transferred in two phases.

Since there is a latency for transferring a window, when the SAVE instruction or the RESTORE instruction is successively executed, there is an interlock between the later SAVE instruction or the later RESTORE instruction and the MOVE process for the earlier SAVE instruction or the earlier RESTORE instruction.

FIG. 27 is a schematic diagram showing a time chart of a process performed when the SAVE instruction is successively executed.

When the SAVE instruction is successively executed as with a program shown in FIG. 27, SAVE (a) causes registers with even reg numbers to be transferred in phase=0 and registers with odd reg numbers to be transferred in phase=1. Since each phase can be pipelined, the latency of the SAVE instruction or the RESTORE instruction is the latency of which "1" is added to the latency of the MOVE process. Thus, when the SAVE instruction is followed by the SAVE instruction or when the RESTORE instruction is followed by the RESTORE instruction, an interlock of which at least "1" is added to the latency of MOVE process is required. On the other hand, the SAVE instruction can be followed by the RESTORE instruction. In addition, the RESTORE instruction can be followed by the SAVE instruction. In phase=0, the contents of registers with even reg numbers (l0, l2, l4, l6, i0 (o0), i2 (o2), i4 (o4), and i6 (o6)) are placed on the MOVE BUS. In phase=1, the contents of registers with odd reg numbers (l1, l3, l5, l7, i1 (o1), i3 (o3), i5 (o5), and i7 (o7)) are placed on the MOVE BUS.

When the SAVE instruction is executed, a window pointed by CWP+2 should be moved. When the RESTORE instruction is executed, a window pointed by CWP-2 should be moved.

The processes performed by the SAVE instruction and the RESTORE instruction are summarized as follows:

FIG. 28 is a schematic diagram for explaining a writing process for a bank of the WRF when the SAVE instruction is executed.

Process performed when SAVE instruction is executed:
The "local" portion and the "out" portion pointed by CWP+2 are transferred from the MRF and placed on the MOVE BUS.
Data on the MOVE BUS is written to addresses in individual banks of the WRF corresponding to the table shown in FIG. 28.
WCWP is updated as follows.
new WCWP [3:2]=(WCWP [3:2]+1−1) mod 3+1
new WCWP [1:0]=(WCWP [1:0]+1) mod 4

FIG. 29 is a schematic diagram for explaining a writing process for a bank of the WRF when the RESTORE instruction is executed.

Process performed when RESTORE instruction is executed:
The "local" portion and the "in" portion pointed by CWP-2 are supplied from the MRF and placed on the MOVE BUS.
Data on the MOVE BUS is written in individual banks of the WRF corresponding to the table shown in FIG. 29.
WCWP is updated as follows.
new WCWP [3:2]=(WCWP [3:2]−1−1) mod 3+1
new WCWP [1:0]=(WCWP [1:0]−1) mod 4

According to the present invention, since working registers for a plurality of windows are stored, the instruction execution order can be changed before a window switching instruction is executed, the process speed of an information processing apparatus corresponding to out-of-order instruction execution system can be improved.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

The invention claimed is:

1. A register file having a master register file and a working register file, data used for a process for an instruction being transferred from the master register file and stored in the working register file, data used for a process for an instruction being read from the working register file, comprising:

a current window pointer unit pointing a current window position for accessing the master register file;

a working register window current pointer unit pointing to a current window position for accessing the working register file; and a unit transferring data from the master register file to the working register file which contains all data of current, preceding and following register windows and updating data of the working register file when the current window pointer is changed so that the master register file stores data of all register windows of an information processing apparatus and the working register file stores data of a window pointed by the current window pointer and data of windows followed and preceded by the window pointed by the current window pointer, wherein each register window comprises a global register, out register, in register, and local register and the out register of the preceding register window overlaps with the in register of the current register window and the out register of the current register window overlaps with the in register of the following register window.

2. The register file as set forth in claim 1,
wherein the unit writes data of a window preceded by or followed by the window of the master register file pointed by the current window pointer unit to the working register file when the current window pointer is varied.

3. The register file as set forth in claim 1,
wherein after a window of the master register file pointed by the current window pointer unit is switched, before the next window switching instruction is executed, data of a window necessary for the next window switching instruction is pre-transferred from the master register file to the working register file.

4. The register file as set forth in claim 1,
wherein the master register file and the working register file are window registers corresponding to an overlap window system.

5. The register file as set forth in claim 4,
wherein when data of a window is transferred from the master register file to the working register file, data that overlaps is not transferred.

6. The register file as set forth in claim 1,
wherein data is transferred from the master register file to the working register file in two phases.

7. The register file as set forth in claim 1,
wherein the master register file is structured in a ring shape as a logical structure.

8. The register file as set forth in claim 1,
wherein when data is written to the register file, the data is written to the master register file and the working register file at a time, and
wherein when data is read from the register file, the data is read from only the working register file.

9. A method for controlling a register file having a master register file and a working register file, data used for a process for an instruction being transferred from the master register file and stored in the working register file, data used for a process for an instruction being read from the working register file, comprising:
providing a current window pointer for pointing a current window position for accessing the master register file and a working register window current pointer for pointing a current window position for accessing the working register file; and
transferring data from the master register file to the working register file which contains all data of current, preceding and following register windows and updating data of the working register file when the current window pointer is changed so that the master register file stores data of all register windows of an information processing apparatus and the working register file stores data of a window pointed by the current window pointer and data of windows followed and preceded by the window pointed by the current window pointer,
wherein each register window comprises a global register, out register, in register, and local register and the out register of the preceding register window overlaps with the in register of the current register window and the out register of the current register window overlaps with the in register of the following register window.

10. The method as set forth in claim 9,
wherein the updating step is performed by writing data of a window preceded by or followed by the window of the master register file pointed by the current window pointer to the working register file when the current window pointer is varied.

11. The method as set forth in claim 9,
wherein after a window of the master register file pointed by the current window pointer is switched, before the next window switching instruction is executed, data of a window necessary for the next window switching instruction is pre-transferred from the master register file to the working register file.

12. The method as set forth in claim 9,
wherein the master register file and the working register file are window registers corresponding to an overlap window system.

13. The method as set forth in claim 12,
wherein when data of a window is transferred from the master register file to the working register file, data that overlaps is not transferred.

14. The method as set forth in claim 9,
wherein data is transferred from the master register file to the working register file in two phases.

15. The method as set forth in claim 9,
wherein the master register file is structured in a ring shape as a logical structure.

16. The method as set forth in claim 9,
wherein when data is written to the register file, the data is written to the master register file and the working register file at a time, and
wherein when data is read from the register file, the data is read from only the working register file.

17. An information processing apparatus, comprising:
an arithmetic logic unit;
a first memory; and
a second memory, wherein,
register windows are stored in the first memory;
copies of a selected register window, the register window immediately preceding the selected register window, and the register window immediately following the selected register window are maintained in the second memory,
wherein each register window comprises a global register, out register, in register, and local register and the out register of the preceding register window overlaps with the in register of the current register window and the out register of the current register window overlaps with the in register of the following register window; and
the arithmetic logic unit reads data from the second memory unit.

* * * * *

UNITED STATES PATENT AND TRADEMARK OFFICE
CERTIFICATE OF CORRECTION

| | | |
|---|---|---|
| PATENT NO. | : 7,093,110 B2 | Page 1 of 1 |
| APPLICATION NO. | : 10/102827 | |
| DATED | : August 15, 2006 | |
| INVENTOR(S) | : Yasukichi Okawa et al. | |

It is certified that error appears in the above-identified patent and that said Letters Patent is hereby corrected as shown below:

First Page Column 2 (Abstract) Line 3, after "written," delete "the'"".

Signed and Sealed this

Twenty-sixth Day of December, 2006

JON W. DUDAS
*Director of the United States Patent and Trademark Office*